US009134819B2

(12) United States Patent
Inaba et al.

(10) Patent No.: US 9,134,819 B2
(45) Date of Patent: Sep. 15, 2015

(54) INPUT DEVICE AND INFORMATION PROCESSING APPARATUS

(75) Inventors: Nobuhide Inaba, Kanagawa (JP); Shin Takeuchi, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 1044 days.

(21) Appl. No.: 12/699,145

(22) Filed: Feb. 3, 2010

(65) Prior Publication Data

US 2011/0043447 A1 Feb. 24, 2011

(30) Foreign Application Priority Data

Aug. 21, 2009 (JP) ................................. 2009-191969

(51) Int. Cl.
*G06F 3/033* (2013.01)
*G06F 3/0354* (2013.01)
(52) U.S. Cl.
CPC .......... *G06F 3/0354* (2013.01); *G06F 3/03548* (2013.01)
(58) Field of Classification Search
CPC .................... G06F 2203/013; G06F 2203/014; G06F 2203/015; G06F 3/038; G06F 3/0338; G06F 3/03543; G06F 1/169; G06F 3/0362; G06F 3/03548; G06F 3/0354
USPC ........................................................ 345/156
See application file for complete search history.

(56) References Cited

U.S. PATENT DOCUMENTS

| 6,184,868 | B1 * | 2/2001 | Shahoian et al. ............. 345/161 |
| 6,373,463 | B1 * | 4/2002 | Beeks ........................... 345/156 |
| 6,525,711 | B1 * | 2/2003 | Shaw et al. ................... 345/156 |
| 6,646,631 | B2 | 11/2003 | Suzuki et al. |
| 7,046,229 | B1 * | 5/2006 | Drake ........................... 345/156 |
| 7,215,320 | B2 | 5/2007 | Takeuchi et al. |
| 2002/0122025 | A1 * | 9/2002 | Suzuki et al. ................. 345/157 |
| 2004/0032395 | A1 * | 2/2004 | Goldenberg et al. ......... 345/156 |

(Continued)

FOREIGN PATENT DOCUMENTS

| JP | 2000-047811 A | 2/2000 |
| JP | 2001-184159 A | 7/2001 |
| JP | 2004-171157 A | 6/2004 |
| JP | 2004-206596 A | 7/2004 |
| JP | 2009-072848 A | 4/2009 |

OTHER PUBLICATIONS

Japanese Office Action in corresponding JP Patent Application 2009-191969 dated Mar. 12, 2013.

*Primary Examiner* — Towfiq Elahi
(74) *Attorney, Agent, or Firm* — Sughrue Mion, PLLC

(57) ABSTRACT

An input device includes: a main body portion having one surface; a movable portion having a contact surface formed in the one surface of the main body portion, is operated through the contact surface and is movable relative to the main body portion; a supporting portion that is provided in the main body portion and movably supports the movable portion; an applying portion that applies a force to move the movable portion; a determining unit that detects whether there is a contact with the contact surface of the movable portion and determines a state-of-contact whether the contact surface is in contact state or in non-contact state; a controller that controls the applying portion to move the movable portion to a predetermined position when the determined state-of-contact changes from contact state to non-contact state; and an output unit that detects and outputs the amount of movement of the movable portion relative to the main body portion while the determined state-of-contact, and does not output the amount of movement when the controller moves the movable portion.

11 Claims, 19 Drawing Sheets

(56) References Cited

U.S. PATENT DOCUMENTS

| | | |
|---|---|---|
| 2004/0095369 A1 | 5/2004 | Takeuchi et al. |
| 2004/0130529 A1* | 7/2004 | Magara .......................... 345/161 |
| 2005/0168077 A1* | 8/2005 | Akieda et al. ................... 310/12 |
| 2007/0040801 A1* | 2/2007 | Chung .......................... 345/158 |
| 2009/0289779 A1* | 11/2009 | Braun et al. ............... 340/407.2 |

* cited by examiner

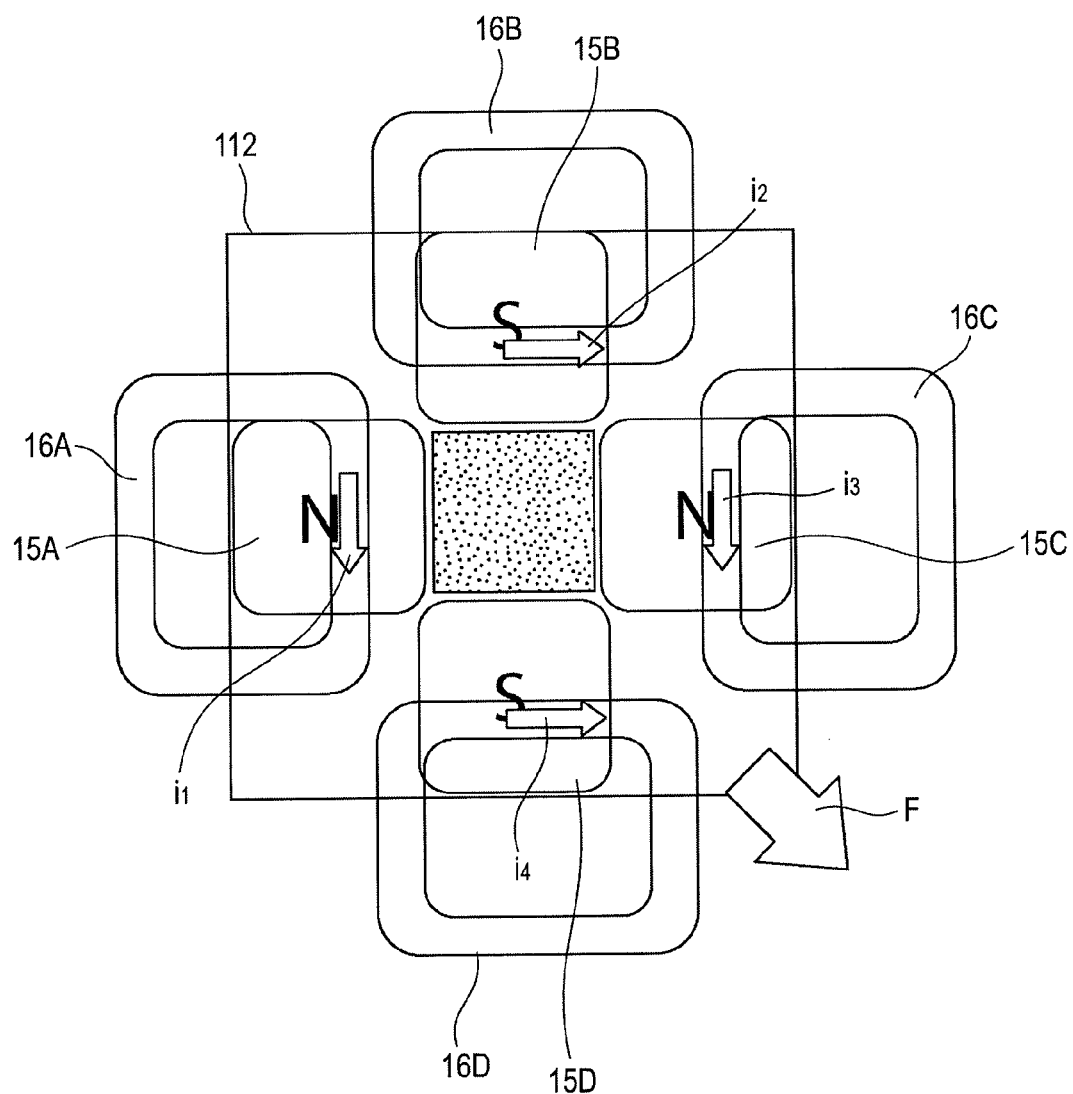

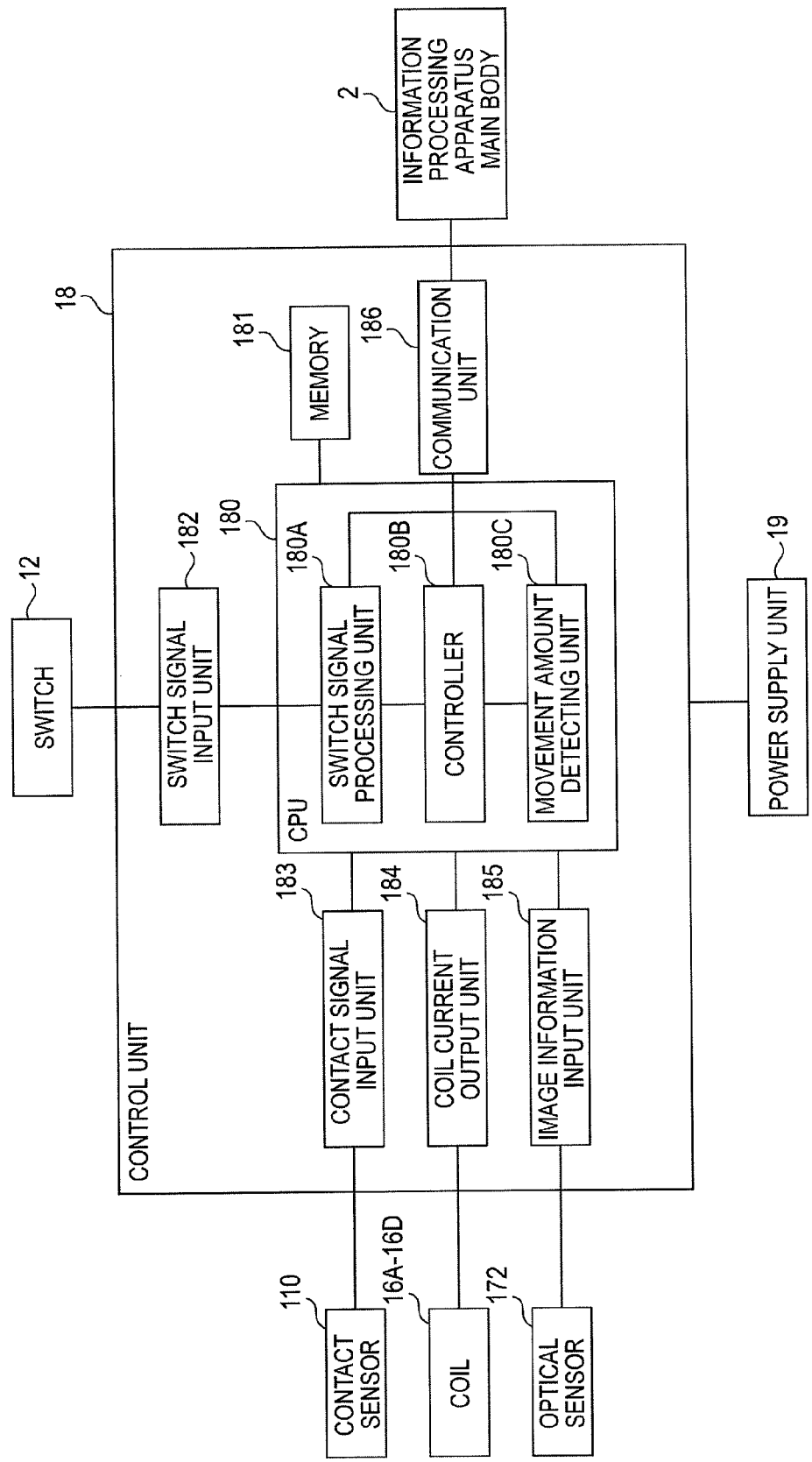

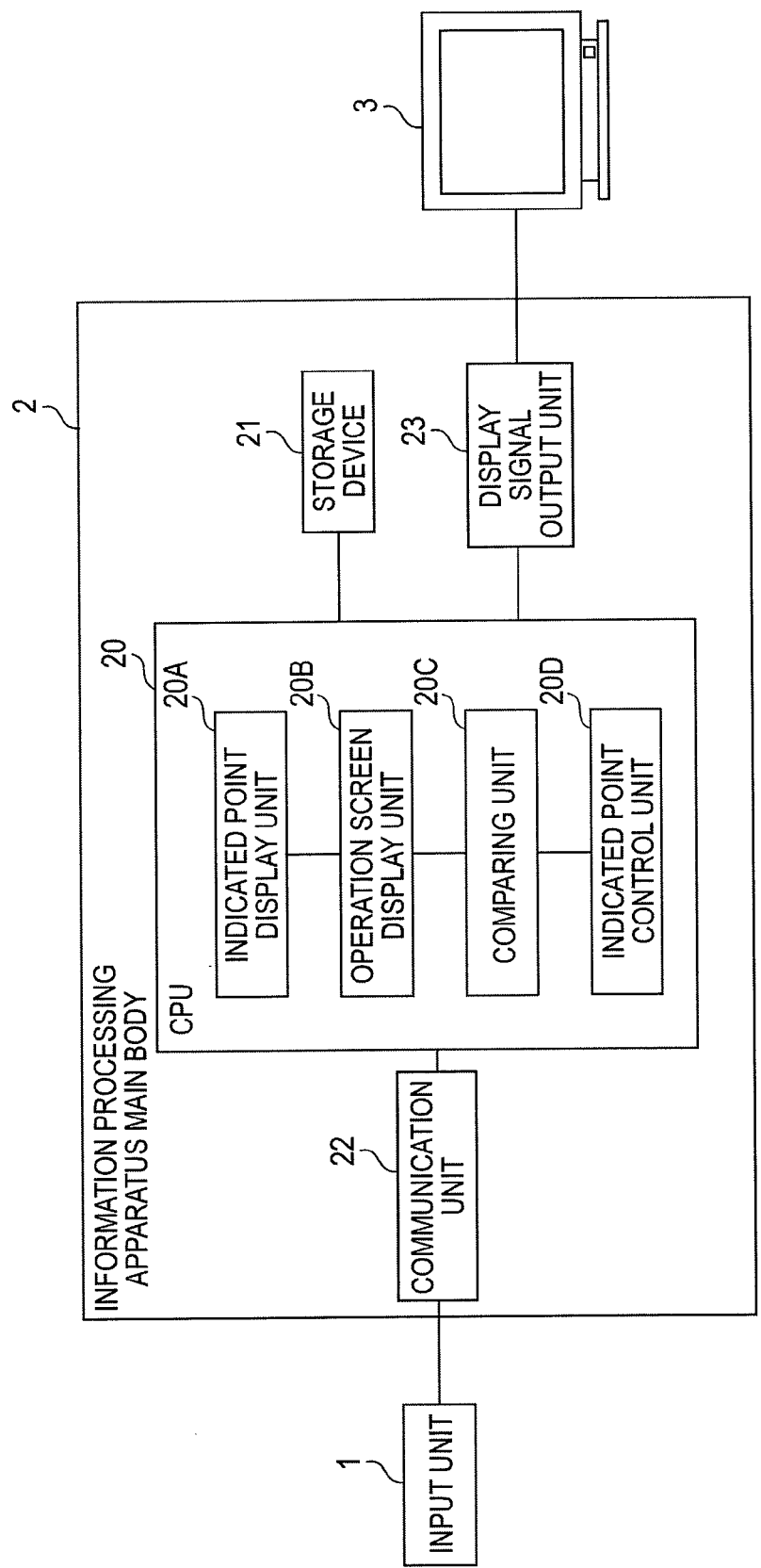

INPUT DEVICE AND INFORMATION PROCESSING APPARATUS

CROSS-REFERENCE TO RELATED APPLICATIONS

This application is based on and claims priority under 35 USC 119 from Japanese Patent Application No. 2009-191969 filed Aug. 21, 2009.

BACKGROUND

Technical Field

The present invention relates to an input device and an information processing apparatus.

SUMMARY

According to an aspect of the invention, there is provided an input device including: a main body portion that has one surface; a movable portion that has a contact surface formed in the one surface of the main body portion, is operated through the contact surface and is movable relative to the main body portion; a supporting portion that is provided in the main body portion and movably supports the movable portion; an applying portion that applies a force to move the movable portion; a determining unit that detects whether there is a contact with the contact surface of the movable portion and determines a state-of-contact whether the contact surface is in contact state or in non-contact state; a controller that controls the applying portion to move the movable portion to a predetermined position when the state-of-contact determined by the determining unit changes from contact state to non-contact state; and an output unit that detects and outputs the amount of movement of the movable portion relative to the main body portion while the state-of-contact determined by the determining unit is in contact state, and does not output the amount of movement when the controller moves the movable portion.

BRIEF DESCRIPTION OF THE DRAWINGS

Exemplary embodiment(s) of the present invention will be described in detail based on the following figures, wherein:

FIG. 4C is a diagram illustrating the driving mechanism according to the first exemplary embodiment of the invention;

FIG. 5 is a block diagram illustrating the structure of a control unit according to the first exemplary embodiment of the invention;

FIG. 14 is a block diagram illustrating the structure of an information processing apparatus main body according to a fifth exemplary embodiment of the invention;

DETAILED DESCRIPTION

First Exemplary Embodiment

Structure of Information Processing Apparatus

Figure 1:
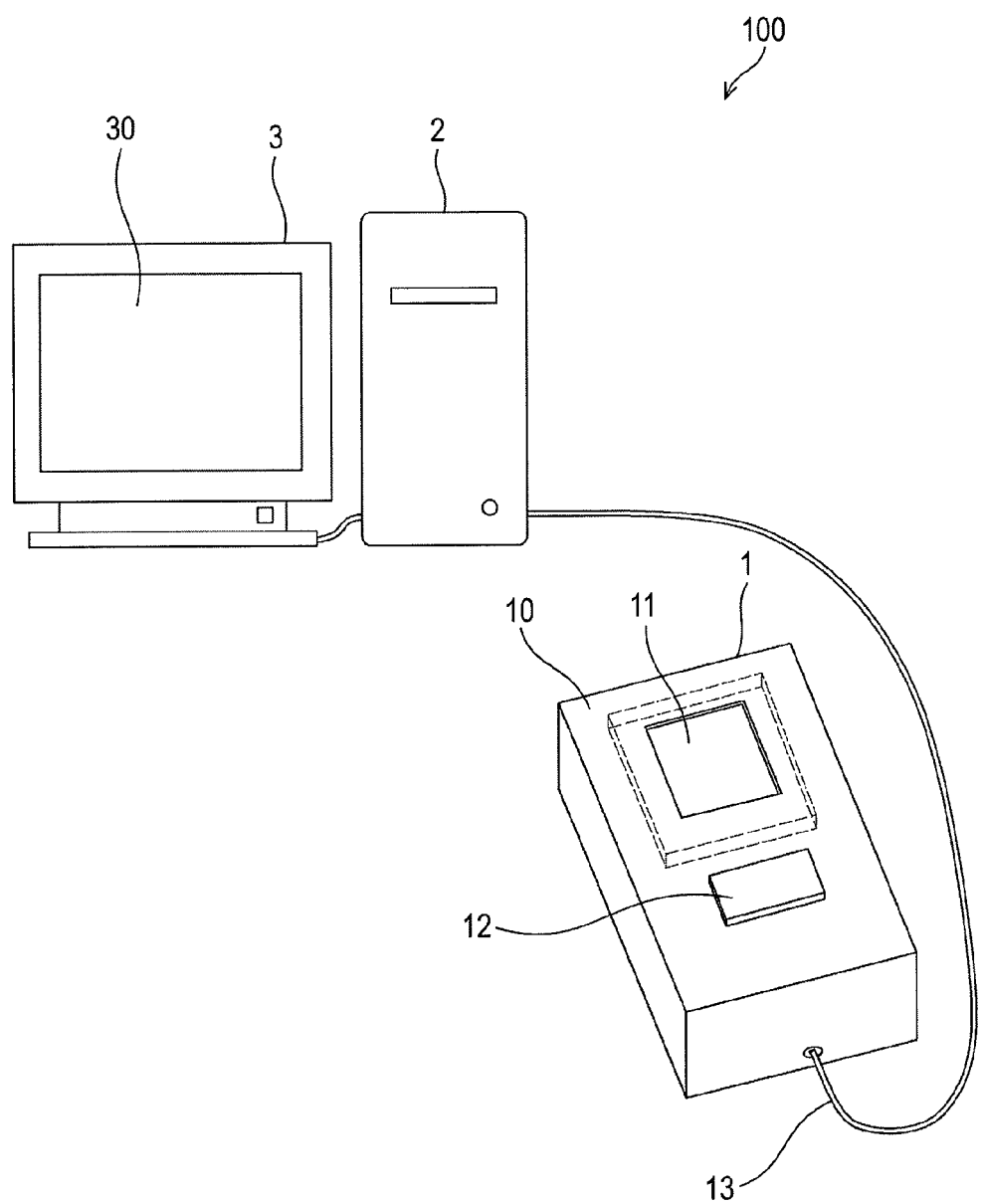
FIG. 1 is a diagram illustrating the overall structure of an information processing apparatus according to a first exemplary embodiment of the invention.

FIG. 1 is a diagram illustrating the overall structure of an information processing apparatus according to a first exemplary embodiment of the invention.

An information processing apparatus 100 includes an input unit 1, which is an input device, an information processing apparatus main body 2 that is connected to the input unit 1, and a display unit 3 that is connected to the information processing apparatus main body 2.

The information processing apparatus main body 2 may be, for example, a personal computer or a server. In addition, the information processing apparatus main body 2 may be a notebook personal computer or a PDA (Personal Digital Assistant) having the display unit 3 integrated therewith.

The display unit 3 receives image information from the information processing apparatus main body 2 and displays it on a screen 30. The display unit 3 may be, for example, an LCD (Liquid Crystal Display), a PDP (Plasma Display Panel), or a CRT (Cathode Ray Tube).

The input unit 1 is connected to the information processing apparatus main body 2 through a cable 13, and includes a main body portion 10, a movable portion 11 that can be moved relative to the main body portion 10 when the operator contacts and operates the movable portion 11 from the outside of the main body portion 10, and a switch 12 that can be operated by the operator. The input unit 1 has a function of detecting the amount of movement of the movable portion 11 relative to the main body portion 10 and the operated state of the switch 12 and outputting the detection result to the information processing apparatus main body 2.

(Structure of Input Unit 1)

Figure 2:
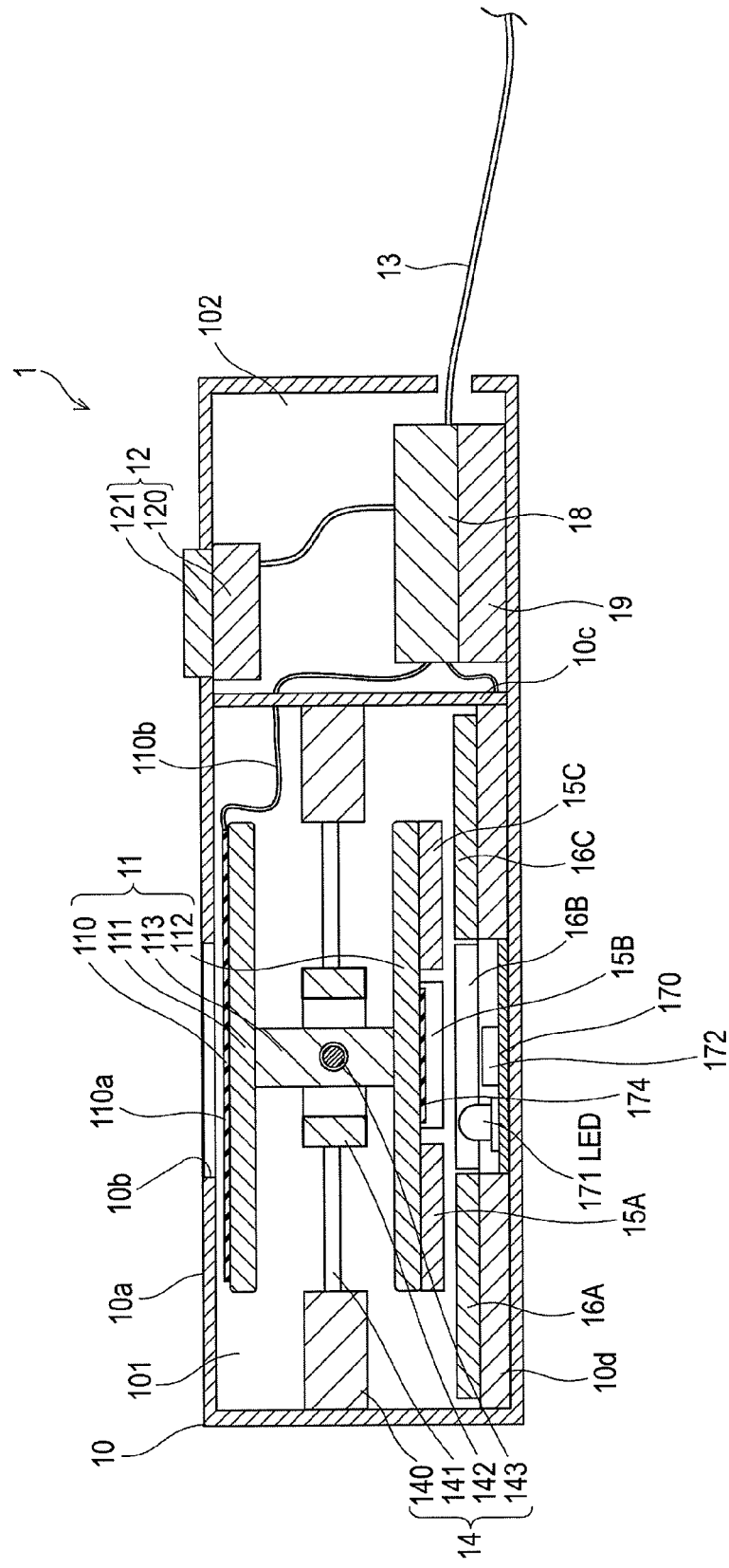
FIG. 2 is a cross-sectional view illustrating an input unit according to the first exemplary embodiment of the invention.

FIG. 2 is a cross-sectional view illustrating the input unit 1.

The main body portion 10 has a box shape and includes a rectangular opening 10b formed in a portion of an upper surface 10a thereof. The inside of the main body portion 10 is partitioned into a first accommodating portion 101 in which the opening 10b is provided and a second accommodating portion 102 in which the switch 12 is provided by a wall portion 10c. A coil attachment portion 10d to which coils 16A, 16B, 16C, . . . , which will be described below, are attached is formed on the bottom of the first accommodating portion 101.

The movable portion 11 is accommodated in the first accommodating portion 101 so as to be movable relative to the main body portion 10. The movable portion 11 is formed by integrally coupling an plate-shaped operating portion 111 having a surface to which a plane-shaped contact sensor 110 is attached, a plate-shaped read plate attachment portion 112 to which a read plate 174 having a geometric pattern formed thereon is fixed, and a connecting portion 113 that connects the operating portion 111 and the read plate attachment portion 112.

Plural magnets 15A, 15B, 15C, . . . are attached around the read plate 174 of the read plate attachment portion 112. The magnets 15A, 15B, 15C, . . . are opposite to the coils 16A, 16B, 16C, . . . , respectively. The structures of the magnets and the coils will be described below.

The contact sensor 110 attached to the operating portion 111 is, for example, a capacitance-type sensor or a pressure-sensitive sensor. The contact sensor 110 faces the opening 10b such that the operator can touch a contact surface 110a of the contact sensor 110 from the outside of the main body portion 10. The area of the contact surface 110a is more than that of the opening 10b, and the contact surface 110a is formed in a region that does not deviate from the opening 10b even when the movable portion 11 is moved relative to the main body portion 10.

For example, when a finger of the operator who operates the input unit 1 contacts the contact surface 110a, an electric signal is generated by the contact. The electric signal is transmitted to a control unit 18, which will be described below, through a conducting wire 110b.

A supporting portion 14 that supports the movable portion 11 so as to be movable relative to the main body portion 10 is provided in the first accommodating portion 101. The supporting portion 14 includes a first supporting member 140, a pair of first shafts 141, a second supporting member 142, and a second shaft 143, and supports the movable portion 11 so as to be movable along a flat moving surface which is in parallel to the upper surface 10a of the main body portion 10. The structure of the supporting portion 14 will be described below.

A printed circuit board 170 is provided in the first accommodating portion 101. An LED 171, which is a light emitting unit, and an optical sensor 172 are mounted on the printed circuit board 170. The LED 171 can illuminate the read plate 174, and the optical sensor 172 is arranged opposite to the read plate 174. The LED 171 and the optical sensor 172 are connected to the control unit 18, which will be described below.

The switch 12 is attached to the second accommodating portion 102. The switch 12 includes a push button portion 121 and a switch main body portion 120. The push button portion 121 is exposed to the outside through a hole that is provided in the main body portion 10. The switch main body portion 120 is fixed to the inside of the second accommodating portion 102.

The control unit 18 and a power supply unit 19 are accommodated in the second accommodating portion 102. The control unit 18 includes, for example, a CPU (Central Processing Unit) and a memory, and has a function of controlling the input unit 1 on the basis of the electric signal transmitted from the contact sensor 110 or information received from the optical sensor 172.

The power supply unit has replaceable batteries provided therein and supplies power to the control unit 18.

(Structure of Supporting Portion 14)

Figure 3:
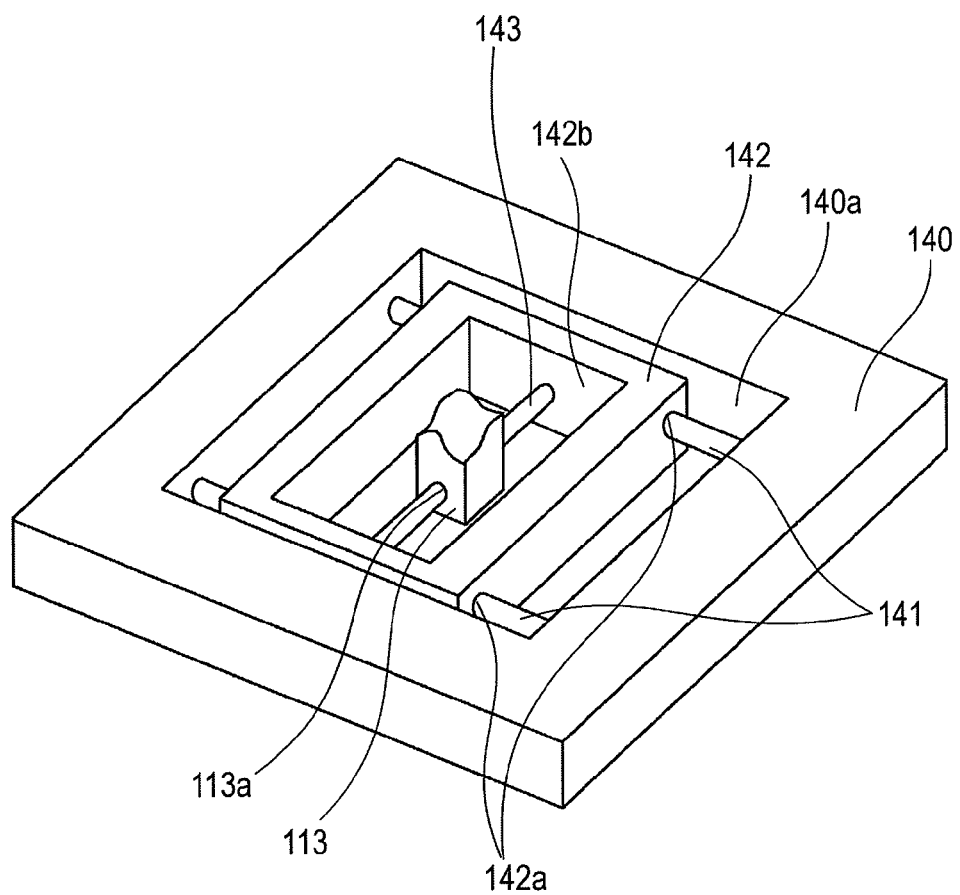
FIG. 3 is a perspective view illustrating the structure of a supporting portion according to the first exemplary embodiment of the invention.

FIG. 3 is a perspective view illustrating the structure of the supporting portion 14.

The first supporting member 140 is fixed to the inner surface of the first accommodating portion 101 and has a rectangular through hole 140a formed therein. A pair of first shafts 141 is fixed to the surfaces of the through hole 140a that are opposite to each other so as to traverse the opposite surfaces of the through hole 140a. The second supporting member 142 is provided in the through hole 140a. A pair of through holes 142a is formed in the second supporting member 142 and the pair of first shafts 141 is fitted to the pair of through holes 142a. The second supporting member 142 can be moved in the direction in which the first shafts 141 extend such that it does not come into contact with the first supporting member 140.

A rectangular through hole 142b is formed in the second supporting member 142. The second shaft 143 is fixed to the surfaces of the through hole 142b that are opposite to each other in a direction orthogonal to the pair of first shafts 141. The connecting portion 113 of the movable portion 11 is disposed in the through hole 142a. The second shaft 143 is fitted to a hole 113a that is formed in the connecting portion 113, and the movable portion 11 can be moved in the direction in which the second shaft 143 extends such that the connecting portion 113 does not come into contact with the second supporting member 142.

According to the above-mentioned structure, the movable portion 11 can be moved in the direction in which the first shafts 141 extend and the direction in which the second shaft 143 extends. In addition, the movable portion 11 can be moved along the moving surface parallel to the upper surface 10a of the main body portion 10.

(Structure of Driving Mechanism for Movable Portion 11)

Figure 4A:
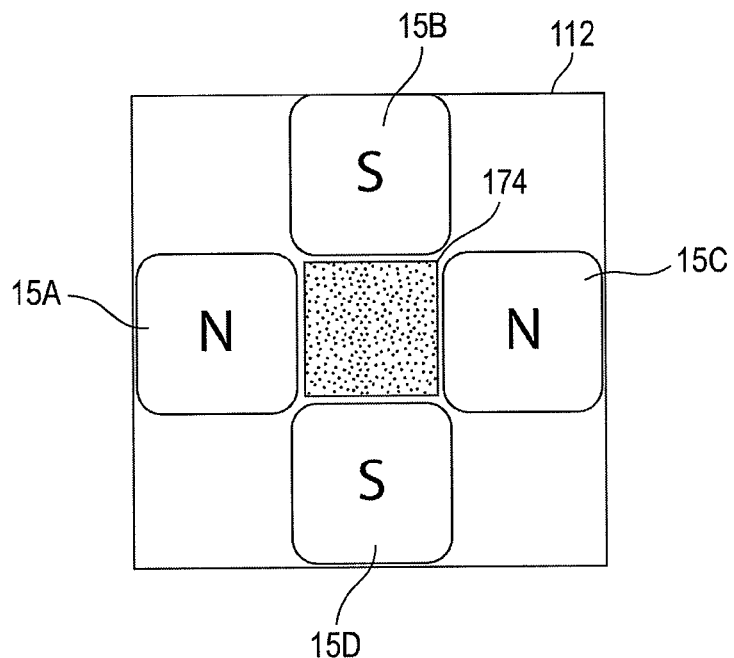
FIGS. 4A and 4B are diagrams illustrating the structure of a driving mechanism that moves a movable portion relative to a main body portion according to the first exemplary embodiment of the invention.
Figure 4B:
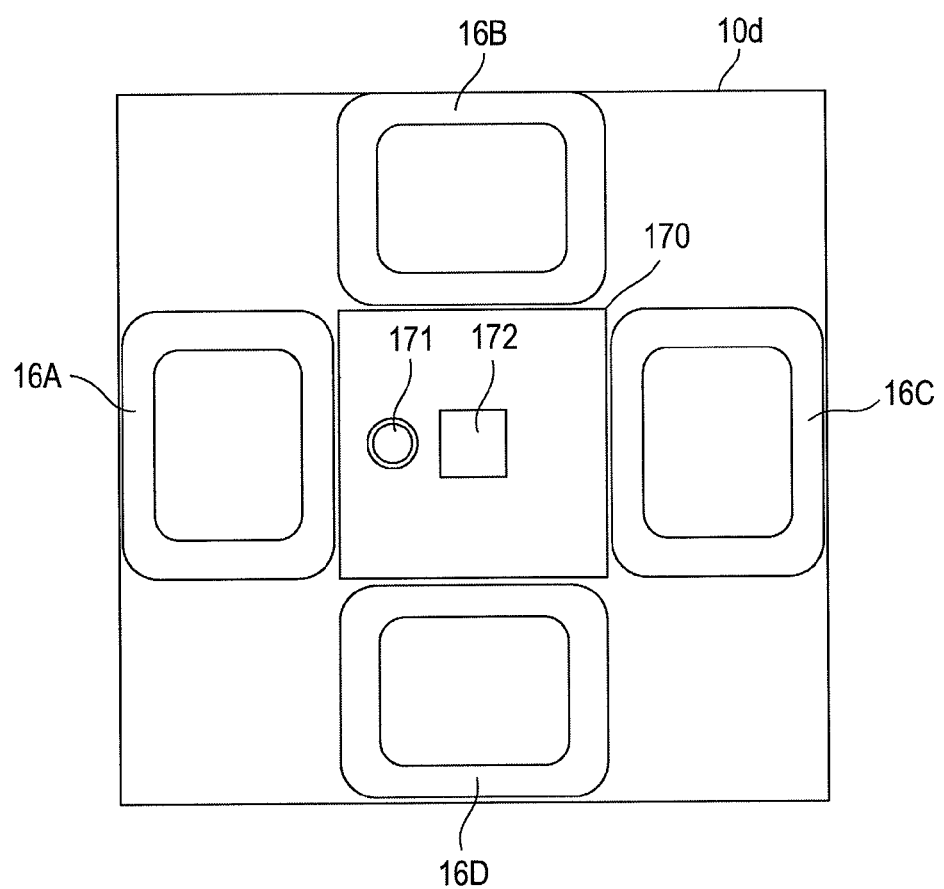

FIGS. 4A and 4B are diagrams illustrating a driving mechanism that moves the movable portion 11 relative to the main body portion 10. The driving mechanism includes plural magnets attached to the read plate attachment portion 112 and plural coils attached to the coil attachment portion 10d. FIG. 4A is a diagram illustrating the read plate attachment portion 112 of the movable portion 11, as viewed from the bottom of the main body portion 10. FIG. 4B is a diagram illustrating the printed circuit board 170 and the coils 16A, 16B, 16C, and 16D attached to the coil attachment portion 10d of the main body portion 10.

As shown in FIG. 4A, four rectangular magnets 15A, 15B, 15C, and 15D are arranged around the read plate 174 on the read plate attachment portion 112 so as to be opposite to four sides of the square-shaped read plate 174. The magnets 15A and 15C are arranged such that the N-pole thereof is disposed on the bottom side of the main body portion 10, and the magnets 15B and 15D are arranged such that the S-pole thereof is disposed on the bottom side of the main body portion 10. In addition, adjacent magnets have different polarities.

As shown in FIG. 4B, four coils 16A, 16B, 16C, and 16D are arranged on the coil attachment portion 10d so as to surround the printed circuit board 170. A winding wire of each coil is connected to the control unit 18, and the control unit 18 controls the amount of current and the flow direction of current.

FIG. 4C is a diagram illustrating the magnets 15A, 15B, 15C, and 15D and the read plate attachment portion 112, as viewed from the bottom of the main body portion 10 through the four coils 16A, 16B, 16C, and 16D. In FIG. 4C, only the outline of each of the coils 16A, 16B, 16C, and 16D is represented by a solid line.

When the read plate attachment portion 112 is moved relative to the coils 16A, 16B, 16C, and 16D in the lower right direction of FIG. 4C, a current flows in the directions of $i_1$, $i_2$, $i_3$, and $i_4$ in FIG. 4C. Then, force applied to the plate attachment portion 112 in the lower right direction of FIG. 4C is generated by magnetic force. The direction and the magnitude of the force applied to the read plate attachment portion 112 can be controlled by the direction of current flowing through each coil and the amount of current.

(Structure and Operation of Control Unit 18)

FIG. 5 is a block diagram illustrating the structure of the control unit 18.

The control unit 18 includes a CPU (Central Processing Unit) 180, a memory 181 connected to the CPU 180, a switch signal input unit 182, a contact signal input unit 183, a coil current output unit 184, an image information input unit 185, and a communication unit 186.

The memory 181 stores programs executed by the CPU 180 and information required for the CPU 180 to execute the programs. The memory 181 is a semiconductor memory, such as an SRAM (Static Random Access Memory), a DRAM (Dynamic Random Access Memory), or a flash memory.

The CPU 180 executes the program stored in the memory 181 to function as a switch signal processing unit 180A, a controller 180B, and a movement amount detecting unit 180C.

The switch signal input unit 182 receives an output signal from the switch 12, converts the received signal into an electric signal indicating an on state in which the push button portion 121 of the switch 12 is pushed or an off state in which the push button portion 121 is not pushed, and outputs the electric signal to the switch signal processing unit 180A of the CPU 180. The switch signal processing unit 180A receives the electric signal input from the switch signal input unit 182 at a predetermined time interval (for example, 1 ms). When it is detected that the switch 12 is changed from the off state to the on state, the switch signal processing unit 180A transmits information indicating the change to the information processing apparatus main body 2 through the communication unit 186.

The contact signal input unit 183, which is an example of a determining unit, receives an output signal from the contact sensor 110, determines whether the current state is a contact state in which, for example, the finger of the operator contacts the contact surface 110a of the contact sensor 110 or a non-contact state in which, for example, the finger of the operator does not contact the contact surface 110a of the contact sensor 110, and outputs an electric signal indicating the determination result to the controller 180B of the CPU 180.

The coil current output unit 184 acquires information about the direction of current flowing through each of the coils 16A, 16B, 16C, and 16D and the amount of current from the controller 180B of the CPU 180, and supplies a current to each coil. The coil current output unit 184 includes a switching circuit having a switching element, such as a transistor.

The image information input unit 185 receives an output signal from the optical sensor 172. The optical sensor 172 includes a CCD (Charge Coupled Device) having plural pixels that are two-dimensionally arranged. When light emitted from the LED 171 is reflected from the read plate 174, the CCD receives the reflected light through a lens, and the optical sensor 172 converts the received light into an electric signal. The CCD includes, for example, 16×16 (256) pixels, and outputs light reflected from the read plate 174 as image information to the image information input unit 185. The image information input unit 185 outputs the image information to the movement amount detecting unit 180C of the CPU 180.

The movement amount detecting unit 180C receives the image information from the image information input unit 185 at a predetermined time interval (for example, 1 ms), compares the received image information with the previous image information, and detects the amount of movement of the movable portion 11 from the previous position. The amount of movement means the amount of movement of the movable portion 11 guided by the supporting portion 14 in two directions that intersect each other, and indicates the movement direction of the movable portion 11 relative to the main body portion 10 and the movement distance of the movable portion 11. The movement amount detecting unit 180C transmits information on the detected amount of movement to the information processing apparatus main body 2 through the communication unit 186.

The communication unit 186 transmits information received from the switch signal processing unit 180A and the movement amount detecting unit 180C of the CPU 180 to the information processing apparatus main body 2 through the cable 13.

Figure 6:
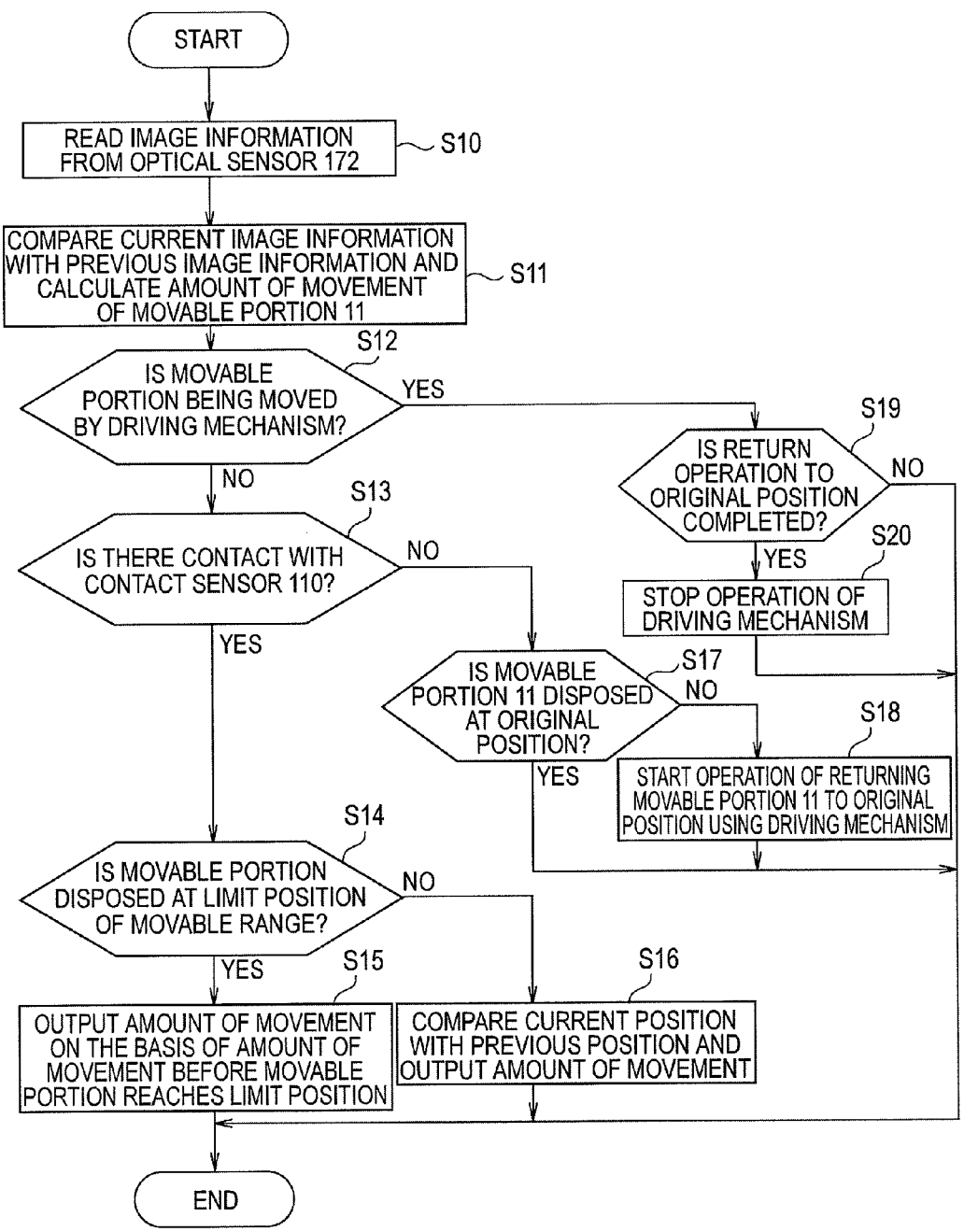
FIG. 6 is a flowchart illustrating an example of the operation of the input unit according to the first exemplary embodiment of the invention.

FIG. 6 is a flowchart illustrating an example of the operation of the input unit 1. The process shown in the flowchart is performed at a predetermined time interval (for example, 1 ms) by the controller 180B and the movement amount detecting unit 180C.

The movement amount detecting unit 180C reads the image information of the optical sensor 172 from the image information input unit 185 (S10). Then, the movement amount detecting unit 180C detects the position of the movable portion 11 from the image information read in Step S10 (S11). Step S11 will be described in detail below.

Then, the controller 180B determines whether the driving mechanism is moving the movable portion 11 (S12). If it is determined that the driving mechanism does not move the movable portion 11 (S12; No), the controller 180B receives a signal indicating the contact state or the non-contact state from the contact signal input unit 183, and determines whether there is a contact with the contact sensor 110 (S13). If it is determined that there is a contact with the contact sensor 110 (S13; Yes), the movement amount detecting unit 180C determines whether the movable portion 11 is disposed at a limit position of the movable range (S14).

If it is determined that the movable portion 11 is disposed at the limit position of the movable range, the movement amount detecting unit 180C averages the amount of movements of the movable portion 11 a predetermined number of times (for example, 10 times) before the movable portion 11 reaches the limit position, and outputs the average value as information of the amount of movement to the information processing apparatus main body 2 through the communication unit 186 (S15). If it is determined that the movable portion 11 is disposed at the limit position, the movement amount detecting unit 180C outputs the information of the amount of movement of the movable portion 11 to the information processing apparatus main body 2 through the communication unit 186 on the basis of the difference between the previous position of the movable portion 11 and the current position of the movable portion 11 (S16).

If it is determined in Step S13 that there is no contact with the contact sensor 110 (S13; No), the controller 180B determines whether the position of the movable portion 11 detected in Step S11 is the original position (S17). If it is determined that the movable portion 11 is disposed at the original position (S17; Yes), the process shown in the flowchart ends. If it is determined that the movable portion 11 is not disposed at the original position, an operation for returning the movable portion 11 to the original position using the driving mechanism starts (S18). The original position is a position where the center of the contact surface 110a of the contact sensor 110 overlaps the center of the opening 10b.

If it is determined in Step S12 that the driving mechanism is moving the movable portion 11 (S12; Yes), the controller 180B determines whether the return operation to the original position is completed (S19). If it is determined that the return operation is completed (S19; Yes), the controller 180B stops the operation of the driving mechanism (S20). If it is determined that the return operation is not completed (S19; No), the controller 180B ends the process without stopping the operation of the driving mechanism.

The controller 180B performs the return operation by controlling the amount of current flowing through each of the coils 16A, 16B, 16C, and 16D and the flow direction of current on the basis of the amount and direction of displacement between the current position and the original position of the movable portion 11 and the displacement direction, separately from the process of the flowchart shown in FIG. 6.

Next, the process of the movement amount detecting unit 180C detecting the amount of movement of the movable portion 11 in Step S11 will be described. The input unit 1 according to this exemplary embodiment differs from a general pointing device in that, since it is necessary to perform the return operation to the original position, it is possible to detect the absolute position of the movable portion 11 relative to the main body portion 10, not a variation in the position of the movable portion 11 (the position of the movable portion 11 relative to the previous position).

Figure 7:
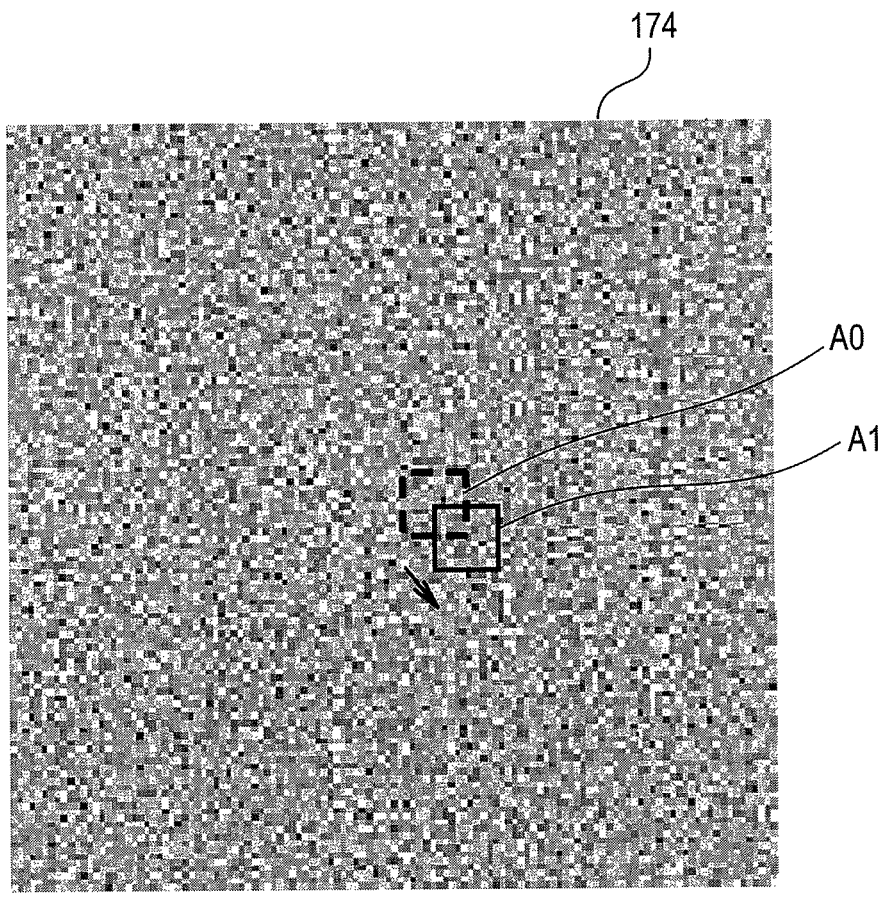
FIG. 7 is a diagram illustrating a pattern drawn on a read plate according to the first exemplary embodiment of the invention, as viewed from an optical sensor.

FIG. 7 is a diagram illustrating a pattern drawn on the read plate 174, as viewed from the optical sensor 172. In the pattern, a region A1 can be read by the optical sensor 172 at once. The region read by the optical sensor 172 is moved with the movement of the main body portion 10 of the movable portion 11.

An irregular pattern is drawn on the read plate 174. When the region read by the optical sensor 172 is moved, a different pattern is read. Therefore, it is possible to detect the read position of the optical sensor 172 and the absolute position of the movable portion 11 relative to the main body portion 10 by checking the position of the image read by the optical sensor 172 on the pattern drawn on the read plate 174. In addition, it is possible to detect the amount of movement of the movable portion 11 by calculating the difference between the previous absolute position detected from the range (a region A0 in FIG. 7) of the image read by the optical sensor 172 and the current absolute position.

The entire pattern of the read plate 174 is stored in the memory 181, and the movement amount detecting unit 180C checks the pattern of the read plate 174 and the image read by the optical sensor 172 to detect the absolute position of the movable portion 11.

Figure 8:
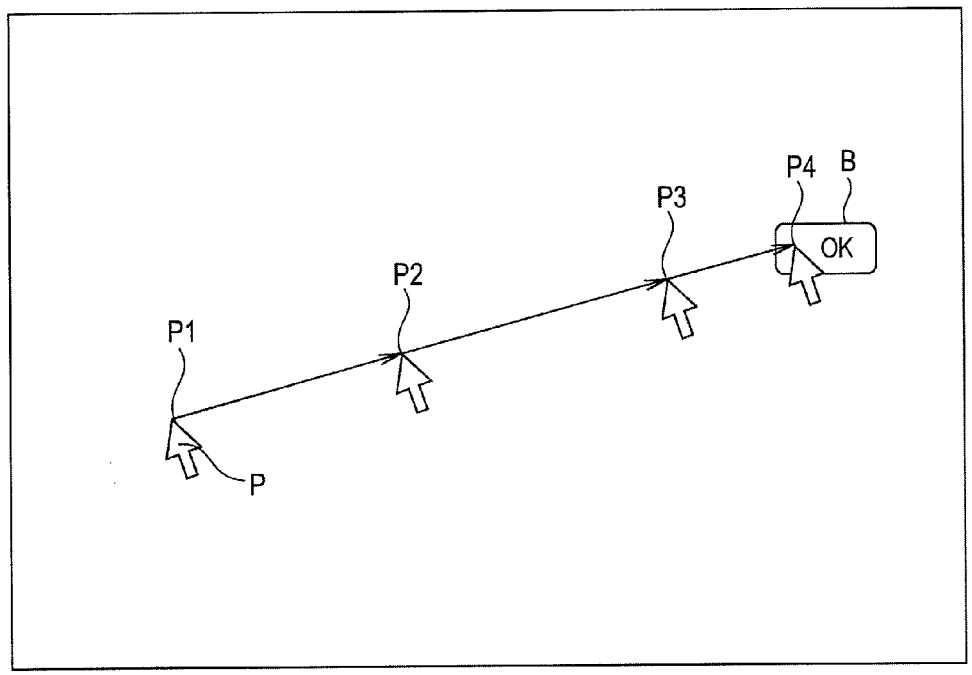
FIG. 8 is a diagram illustrating an example of the operation of a pointer on a screen of a display unit according to the first exemplary embodiment of the invention.

FIG. 8 is a diagram illustrating an example of the operation of a pointer P on the screen 30 of the display unit 3. In the example of the operation, FIG. 8 shows the movement of the pointer P from a position P1 to a position P4 in order to select the button B and push the switch 12 together with the timing chart of the operation by the operator.

During the period from a time t0 to a time t1, the operator contacts the contact sensor 110 of the movable portion 11 with a finger to move the movable portion 11 relative to the main body portion 10 from the original position toward a diagonally forward right direction. The movement of the movable portion 11 is read as a variation in the image information of the optical sensor 172 by the movement amount detecting unit 180C, and the information of the amount of movement is transmitted to the information processing apparatus main body 2. The information processing apparatus main body 2 moves the display position of the pointer P on the screen 30 from the position P1 to a position P2 on the basis of the received information of the amount of movement.

When the finger of the operator is taken away from the contact sensor 110 at the time t1, the operation for returning the position of the movable portion 11 to the original position using the driving mechanism starts, and the driving mechanism completes the return operation until the time t2. The magnitude of the magnetic force of each of the magnets 15A, 15B, 15C, and 15D and the amount of current flowing through each of the coils 16A, 16B, 16C, and 16D are set such that the return operation is completed within 0.5 second, preferably, 0.2 second after the finger of the operator is taken away from the contact sensor even when the movable portion 11 is moved from a point that is furthest away from the original position. During the return operation, even when the movable portion 11 is moved, the information of the amount of movement is not transmitted to the information processing apparatus main body 2. Therefore, the display position of the pointer P on the screen 30 does not vary.

During the period from a time t2 to a time t3, the operator contacts the contact sensor 110 of the movable portion 11 with the finger again to move the movable portion 11. Then, the pointer P is moved from the position P2 to a position P3 on the screen 30. In the example of the operation, it is assumed that, when the pointer P is moved to the position P3, the movable portion reaches the limit position of movement. The operator can recognize that the movable portion 11 reaches the limit position with the feeling of the finger.

When the operator keeps the movable portion 11 at the limit position, the movement amount detecting unit 180C transmits the information of the amount of movement to the information processing apparatus main body 2 on the basis of the amount of movement before the movable portion reaches the limit position. Therefore, even when the movable portion 11 is not actually moved, the display position of the pointer P on the screen 30 is continuously moved from the position P3. When the finger of the operator is taken away from the contact sensor 110 at a time t4, the pointer P stops at that position (position P4). In this state, when the operator pushes the switch 12, the information is transmitted to the information processing apparatus main body 2, and the information processing apparatus main body 2 performs a process that is stored to be performed when the button B is selected.

Second Exemplary Embodiment

Figure 9:
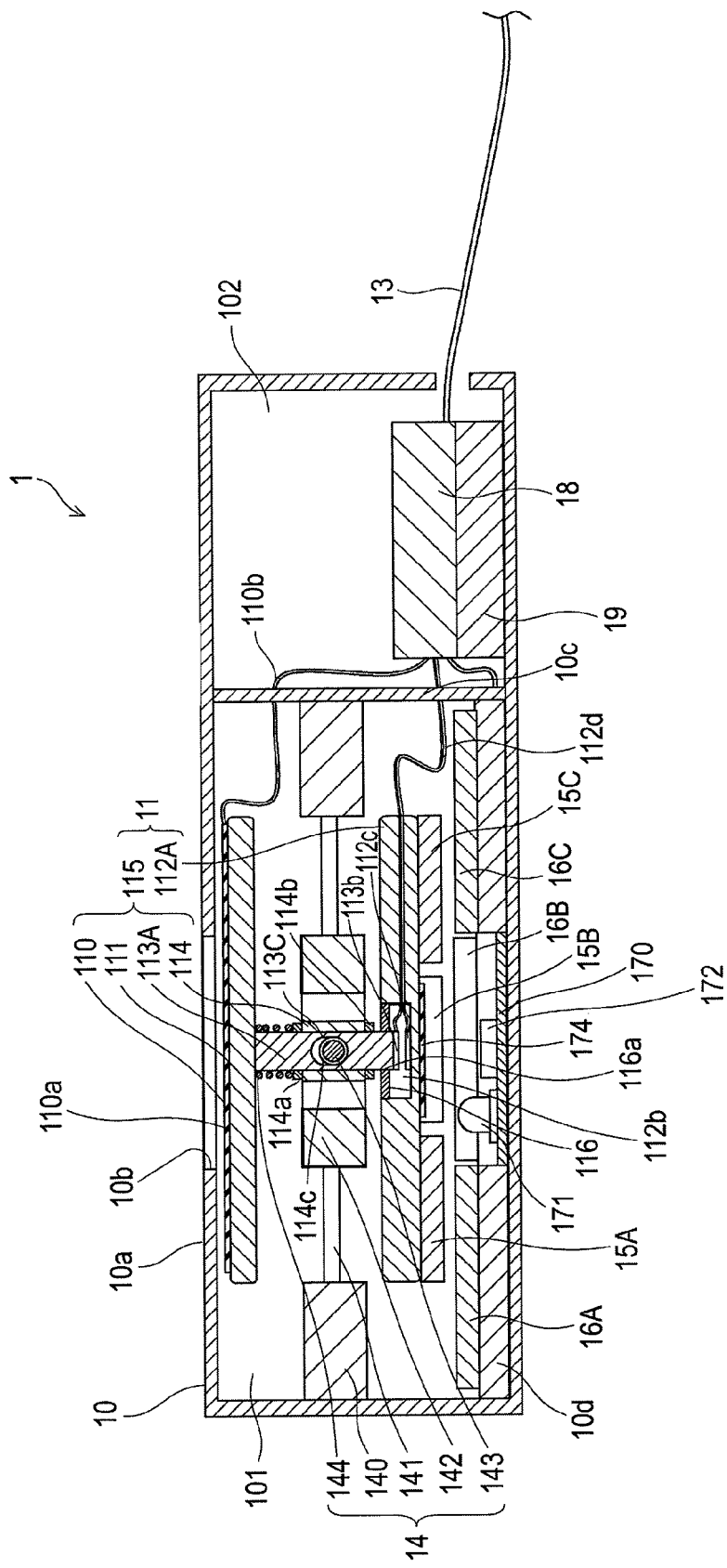
FIG. 9 is a cross-sectional view illustrating an input unit according to a second exemplary embodiment of the invention.

FIG. 9 is a cross-sectional view illustrating an input unit 1 according to a second exemplary embodiment of the invention. The second exemplary embodiment differs from the first exemplary embodiment in that the movable portion 11 includes a supported portion 114 that is supported by the supporting portion 14 and a contact portion 115 that can be moved relative to the supported portion 114, and the movable portion 11 includes a switching mechanism, but does not include the switch 12 according to the first exemplary embodiment. The other components are the same as those in the first exemplary embodiment. Components having the same functions as those in the first exemplary embodiment are denoted by the same reference numerals shown in FIG. 2 and description thereof will be omitted.

The contact portion 115 includes a contact sensor 110 having a contact surface 110a formed on one surface, a plate-shaped operating portion 111 having a surface to which the contact sensor 110 is attached, and a rod-shaped connecting portion 113A having one end fixed to the operating portion 111. The contact portion 115 can be moved relative to the supported portion 114 in a direction vertical to the contact surface 110a. The structure of the supported portion 114 will be described in detail below.

The leading end of the connecting portion 113A is disposed in a concave portion 112b that is formed in the read plate attachment portion 112A to which plural magnets 15A, 15B, 15C, . . . are attached. A lid portion 116 having a through hole 116a formed at the center thereof is attached to an opening of the concave portion 112b, and the connecting portion 113A is slidably fitted to the through hole 116a.

An electrode 113b is formed at one end of the connecting portion 113A close to the concave portion 112b. An electrode 112c is fixed to the bottom of the concave portion 112b that is opposite to the electrode 113b. The electrode 113b and the electrode 112c are connected to the control unit 18 by a wiring line 112d that passes through a hole formed in the read plate attachment portion 112.

The contact portion 115 can be moved relative to the supported portion 114 in the vertical direction of FIG. 9. When the contact portion 115 is moved down in FIG. 9, the electrode 113b contacts the electrode 112c. The control unit 18 detects whether the electrodes 113b and 112c are contacted with each other through the wiring line 112d.

Figure 10:
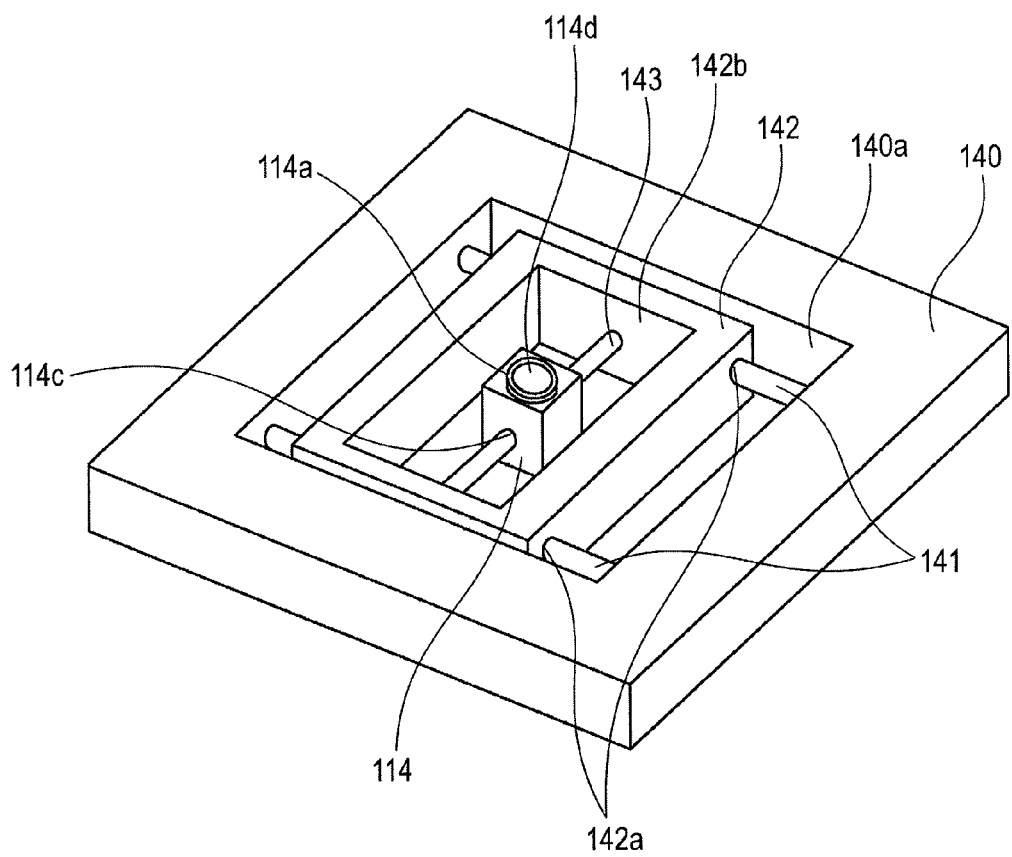
FIG. 10 is a perspective view illustrating the structure of a supporting portion according to the second exemplary embodiment of the invention.

FIG. 10 is a perspective view illustrating the structure of the supporting portion 14 according to the second exemplary embodiment of the invention. Similar to the structure shown in FIG. 3, the second supporting member 142 can be moved along the first shafts 141 that are fixed to the first supporting member 140. The second shaft 143 fixed to the rectangular through hole 142b that is formed in the second supporting member 142 is fitted to a through hole 114c that is formed in the supported portion 114 provided in the through hole 142b. The supported portion 114 can be moved along the second shaft 143.

A through hole 114d is formed in the supported portion 114 in a direction orthogonal to the first shafts 141 and the second shaft 143, that is, a direction vertical to the contact surface 110a of the contact sensor 110. The connecting portion 113A is arranged in the through hole 114d such that it can slide while being guided by a pair of guide members 114a and 114b that is provided at two opening portions of the through hole 114d. A long hole 113c having a length corresponding to the gap between the electrode 113b and the electrode 112c is formed in the connecting portion 113A. The second shaft 143 is inserted into the long hole 113c (see FIG. 9).

A coil spring 144 arranged on the outer circumferential surface of the connecting portion 113A is provided between the operating portion 111 and the guide member 114a facing the operating portion 111. The coil spring 144 applies elastic force such that the supported portion 114 is separated from the operating portion 111.

Similar to the switch 12 according to the first embodiment, output signals from the electrode 113b and the electrode 112c are input to the switch signal input unit 182 of the control unit 18. The switch signal input unit 182 converts the input signal into an electric signal indicating an on state in which the two electrodes 113b are 112c are contacted with each other or an off state in which the electrodes are not contacted with each other, and outputs the converted electric signal to the switch signal processing unit 180A of the CPU 180.

When the user touches the contact surface 110a, the contact portion 115 is moved relative to the supported portion 114 by the touch operation, and the switch including the electrode 113b and the electrode 112c is changed from the off state to the on state. The switch signal processing unit 180A reads the electric signal input from the switch signal input unit 182 at a predetermined time interval (for example, 1 ms). When the switch including the two electrodes 113b and 112c is changed from the off state to the on state, the switch signal processing unit 180A detects a variation in the state of the signal, and transmits information about the variation to the information processing apparatus main body 2 through the communication unit 186.

According to the above-mentioned structure, the operator can turn on the switch without taking the finger away from the movable portion 11. Therefore, it is easy to perform an operation (a so-called 'drag' operation) of moving the pointer with the switch being turned on, as compared to the first exemplary embodiment.

Third Exemplary Embodiment

Figure 11:
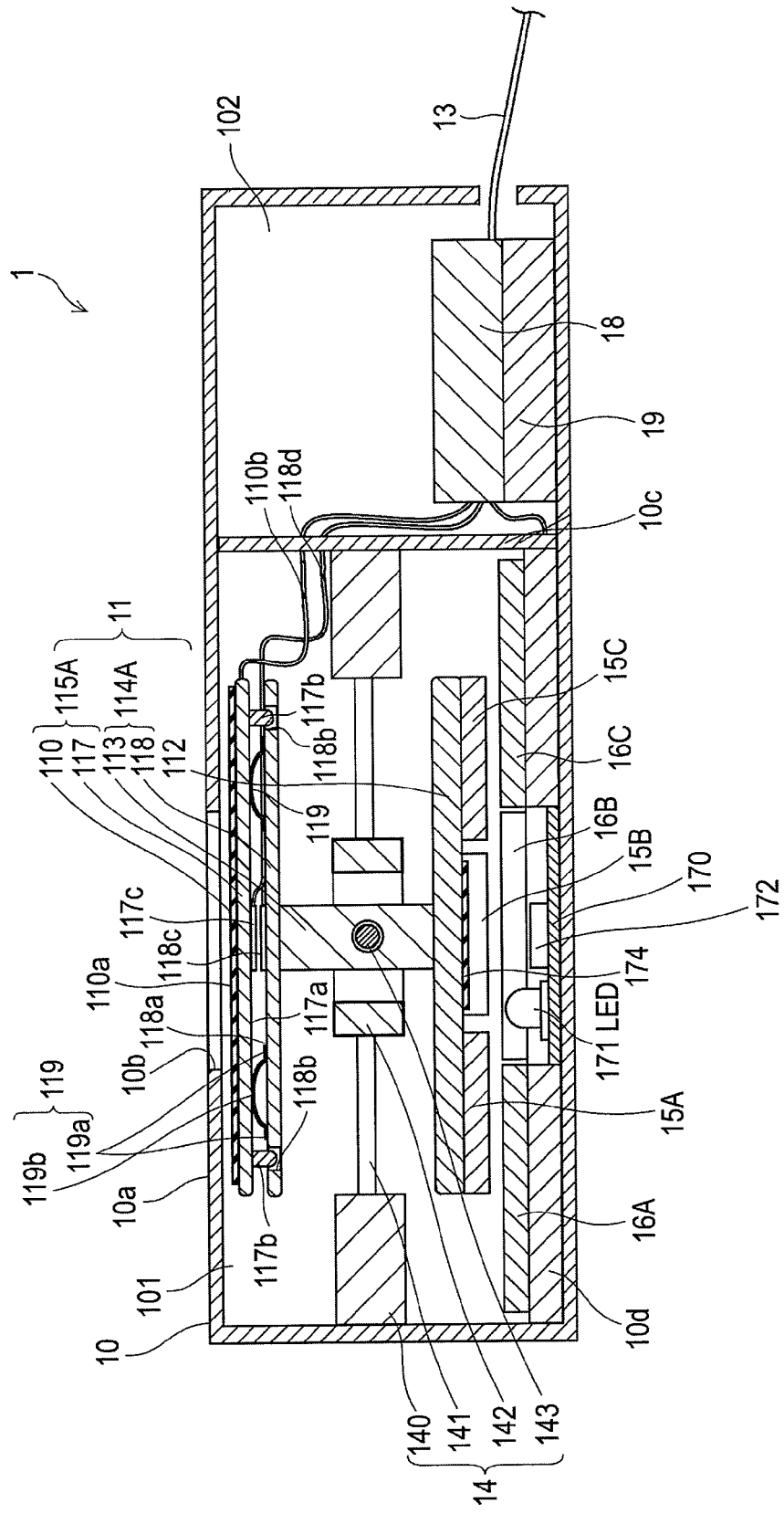
FIG. 11 is a cross-sectional view illustrating an input unit according to a third exemplary embodiment of the invention.

FIG. 11 is a cross-sectional view illustrating an input unit 1 according to a third exemplary embodiment of the invention. The third exemplary embodiment differs from the first exemplary embodiment in that the movable portion 11 includes a supported portion 114A supported by the supporting portion 14 and a contact portion 115A that can be moved relative to the supported portion 114A, and the movable portion 11 includes a switching mechanism, but does not include the switch 12 according to the first exemplary embodiment. The other components are the same as those in the first exemplary embodiment. In the third exemplary embodiment, components having the same functions as those in the first exemplary embodiment are denoted by the same reference numerals shown in FIG. 2 and description thereof will be omitted.

The contact portion 115A includes a contact sensor 110 having a contact surface 110a formed on one surface thereof and a plate-shaped operating portion 117 having a surface to which the contact sensor 110 is attached.

In the operating portion 117, plural protrusions 117b are provided on a rear surface 117a opposite to the surface to which the contact sensor 110 is attached so as to vertically protrude from the rear surface 117a. In addition, an electrode 117c is provided on the rear surface 117a of the operating portion 117.

The supported portion 114A includes a driven portion 118 and a rod-shaped connecting portion 113 having one end fixed to the driven portion 118. A surface 118a of the driven portion 118 faces the rear surface 117a of the operating portion 117.

Plural through holes 118b are formed in the driven portion 118. The protrusions 117b of the operating portion 117 are slidably fitted to the through holes 118b, and the driven portion 118 is configured so as to move to follow the movement of the operating portion 117 along the contact surface 110a.

An electrode 118c is provided on the surface 118a of the driven portion 118 at a position that is opposite to the electrode 117c of the operating portion 117. The electrode 117c and the electrode 118c are connected to the control unit 18 by a wiring line 118d.

Plural leaf spring members 119 are provided between the driven portion 118 and the operating portion 117. Both ends 119a of each of the leaf spring members 119 contact the surface 118a of the driven portion 118, and a central portion 119b of each of the leaf spring members 119 contacts the rear surface 117a of the operating portion 117. In this way, elastic force is applied so as to separate the driven portion 118 from the operating portion 117.

When the operator contacts the contact surface 110a and presses the operating portion 117 against the elastic force of the leaf spring members 119, the operating portion 117 is moved relative to the driven portion 118, and the electrode 117c and the electrode 118c are contacted with each other.

Similar to the switch 12 according to the first exemplary embodiment, an output signal from the switch including the electrode 117c and the electrode 118c is input to the switch signal input unit 182 of the control unit 18. The switch signal input unit 182 converts the input signal into an electric signal indicating an on state in which the two electrodes 117c and 118c are contacted with each other or an off state in which the electrodes are not contacted with each other, and outputs the converted electric signal to the switch signal processing unit 180A of the CPU 180.

The switch signal processing unit 180A receives the electric signal from the switch signal input unit 182 at a predetermined time interval (for example, 1 ms). When it is detected that the switch including the two electrodes 117c and 118c is changed from the off state to the on state, the switch signal processing unit 180A determines that the contact portion 115A is moved relative to the supported portion 114A, and transmits information indicating the relative movement to the information processing apparatus main body 2 through the communication unit 186.

Fourth Exemplary Embodiment

Figure 12:
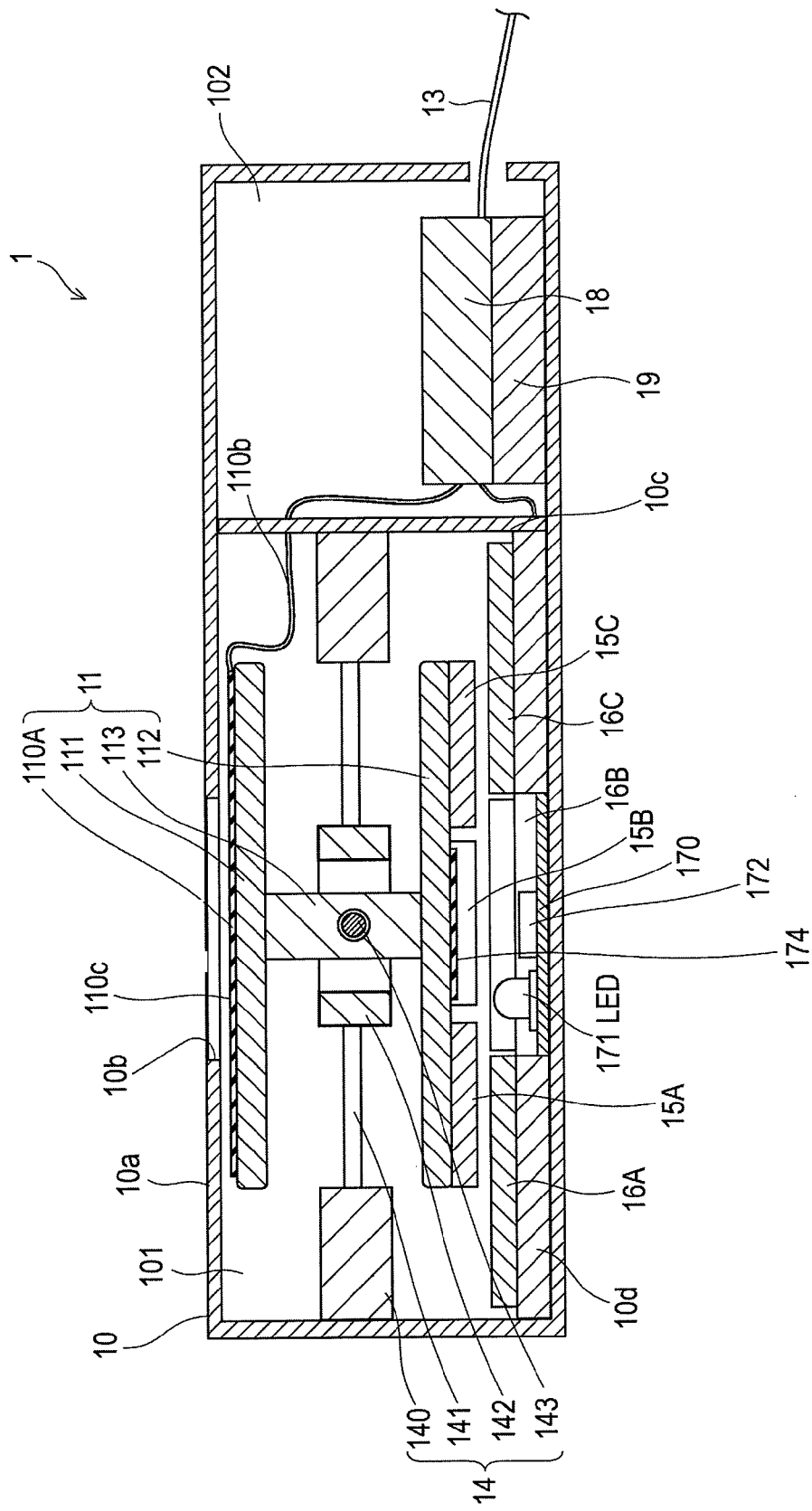
FIG. 12 is a cross-sectional view illustrating an input unit according to a fourth exemplary embodiment of the invention.

FIG. 12 is a cross-sectional view illustrating an input unit 1 according to a fourth exemplary embodiment of the invention. The fourth exemplary embodiment differs from the first exemplary embodiment in that a pressure sensor which outputs an electric signal corresponding to the level of pressure applied to a contact surface 110c is provided on the surface of the operating portion 111, instead of the contact sensor 110 of the input unit shown in FIG. 2, and the switch 12 is not provided. The other components are the same as those in the first exemplary embodiment.

Figure 13:
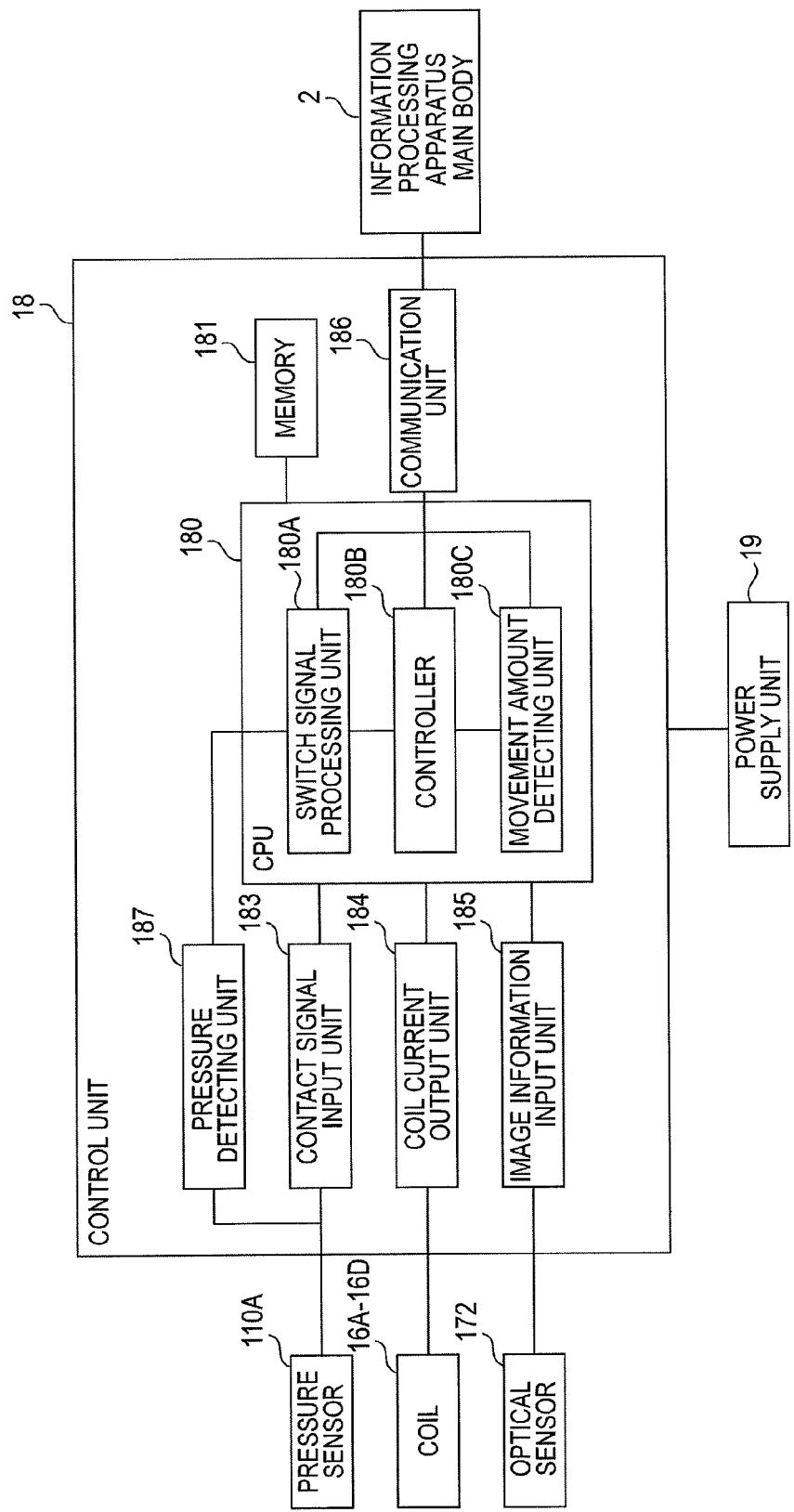
FIG. 13 is a block diagram illustrating the structure of a control unit according to the fourth exemplary embodiment of the invention.

FIG. 13 is a block diagram illustrating the structure of a control unit 18 according to the fourth exemplary embodiment of the invention. The block diagram shown in FIG. 13 differs from that according to the first exemplary embodiment shown in FIG. 5 in that the control unit 18 includes a pressure detecting unit 187, which is an example of a detecting unit, instead of the switch signal input unit 182. The other components are the same as those in the first exemplary embodiment.

The pressure detecting unit 187 receives an electric signal indicating a level of the pressure applied to the contact surface 110c from a pressure sensor 110A and detects the pressure when the pressure applied to the contact surface 110c is more than a predetermined threshold value. The pressure detecting unit 187 outputs an electric signal indicating whether the pressure applied to the contact surface 110c is more or less than the predetermined threshold value to the switch signal processing unit 180A of the CPU 180. The threshold value is set to a value more than the pressing force applied to the contact surface 110c by the operator to move the movable portion 11 relative to the main body portion 10.

The switch signal processing unit 180A reads the electric signal input from the pressure detecting unit 187 at a predetermined time interval (for example, 1 ms). When it is detected that the pressure applied to the contact surface 110c is more than the predetermined threshold value, the switch signal processing unit 180A transmits information indicating the detection result to the information processing apparatus main body 2 through the communication unit 186.

The contact signal input unit 183 receives the electric signal of the pressure sensor 110A, determines whether the finger of the operator contacts or does not contact the contact surface 110c of the pressure sensor 110A, and outputs an electric signal indicating the determination result to the controller 180B of the CPU 180.

The operator contacts the contact surface 110c to move the movable portion 11 relative to the main body portion 10, thereby moving the pointer P as shown in FIG. 8, for example. In this case, the pressing force applied to the contact surface 110c is less than the threshold value, and the pressure detecting unit 187 does not output an electric signal indicating that the pressure applied to the contact surface 110c is more than the predetermined threshold value.

When the pointer P reaches a target position and the operator strongly presses the contact surface 110c, the pressure detecting unit 187 outputs the electric signal indicating that the pressure applied to the contact surface 110c is more than the predetermined threshold value to the switch signal processing unit 180A, and information indicating that the pressure is more than the predetermined threshold value is transmitted to the information processing apparatus main body 2 through the communication unit 186. Then, the information processing apparatus main body 2 performs the same process as that when the switch 12 is pushed.

Fifth Exemplary Embodiment

FIG. 14 is a block diagram illustrating the structure of an information processing apparatus main body 2 according to a fifth exemplary embodiment of the invention. The information processing apparatus main body 2 according to this exemplary embodiment is connected to the input unit 1 and the display unit 3, similar to the first exemplary embodiment. FIG. 14 shows only the components related to the input unit 1 among the components of the information processing apparatus main body 2.

The information processing apparatus main body 2 includes a CPU (Central Processing Unit) 20, a storage device 21 that is connected to the CPU 20, a communication unit 22, and a display signal output unit 23. The storage device 21 stores programs executed by the CPU 20 and information required for the CPU 20 to execute the programs. The storage device 21 is, for example, a DRAM (Dynamic Random Access Memory) or an HDD (Hard Disk Drive).

The CPU 20 executes the program stored in the storage device 21 to function as an indicated point display unit 20A, an operation screen display unit 20B, a comparing unit 20C, and an indicated point control unit 20D.

The indicated point display unit 20A receives information of the amount of movement of the movable portion 11 from the input unit 1 through the communication unit 22, converts the received information into information indicating the movement direction and the movement distance of the pointer of the coordinates on the screen 30, and calculates the new coordinates of the pointer by applying the movement direction and the movement distance to the current coordinates of the pointer on the screen 30. The new coordinates of the pointer are transmitted to the display signal output unit 23, and a display signal to be transmitted to the display unit 3 is generated.

The operation screen display unit 20B generates information of an operation screen displayed on the screen 30 of the display unit 3 according to the program stored in the storage device 21. The operation screen includes plural operation buttons. The storage device 21 stores programs related to the process to be performed when the operation buttons are selected. In addition, plural sections are set on the operation screen.

The comparing unit 20C compares the position of the content displayed on the operation screen with the position of the indicated point of the pointer. Specifically, the comparing unit 20C compares the coordinates indicated by the pointer with the coordinates of the operation buttons on the operation screen, and compares the coordinates indicated by the pointer with the coordinates of the sections on the operation screen. Then, the comparing unit 20C transmits information indicating the comparison results to the indicated point control unit 20D.

The indicated point control unit 20D transmits instructions to the controller 180B of the input unit 1 through the communication unit 22 and controls the driving mechanism to apply force to the movable portion 11, on the basis of the information transmitted from the comparing unit 20C.

(Examples of Operation)

Figure 15A:
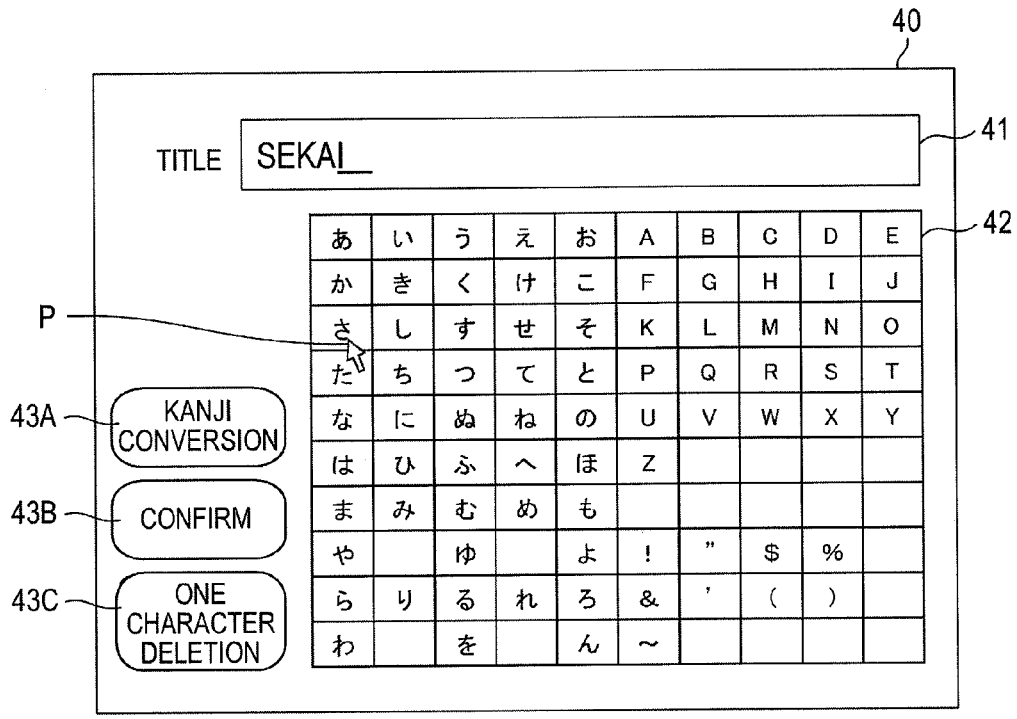
FIGS. 15A to 15D are diagrams schematically illustrating an example of the display of a screen of a display unit according to the fifth exemplary embodiment of the invention.
Figure 15B:
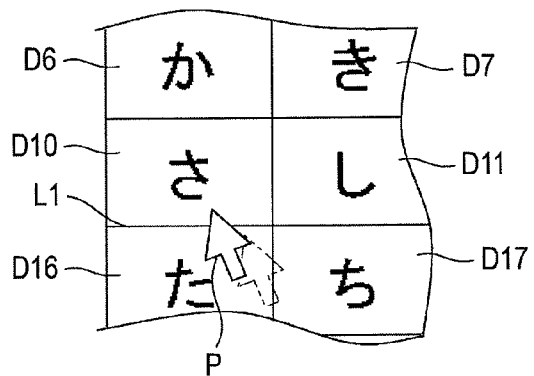
Figure 15C:
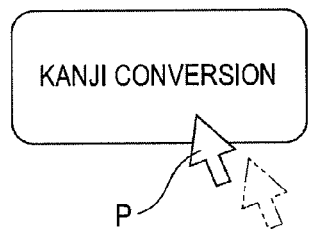
Figure 15D:
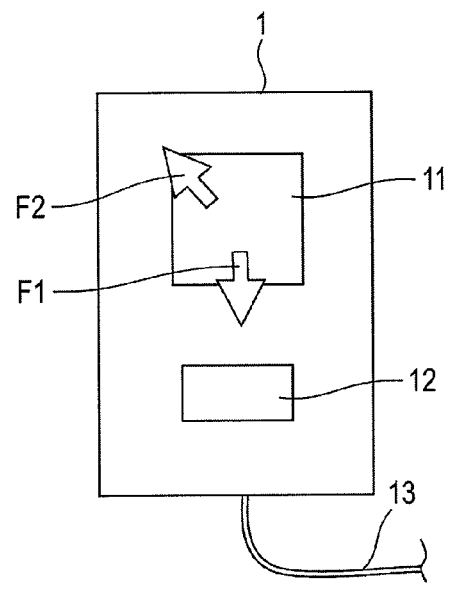

FIG. 15A is a diagram schematically illustrating an example of the display of the screen 30 of the display unit 3 according to the fifth exemplary embodiment of the invention. FIGS. 15B and 15C are enlarged views schematically illustrating a portion of the screen 30. FIG. 15D is a diagram schematically illustrating the direction of force applied to the movable portion 11 of the input unit 1.

An operation screen 40 displayed on the screen 30 includes a title input portion 41, a character display portion 42, a 'kanji conversion' button 43A, a 'confirm' button 43B, and a 'one character deletion' button 43C. The pointer P is displayed so as to overlap the operation screen 40. In the operation screen 40, which is an example of display, display content is configured such that the characters displayed on the screen 30 are selected and kanji conversion is performed on the selected characters to input a title.

The processes to be performed when the operation buttons ('kanji conversion', 'confirm', and 'one character deletion' buttons) arranged on the left side of the operation screen are selected are stored in the storage device 21. A program related to a process of converting hiragana characters input by the selection of characters into kanji characters is stored in the storage device so as to be associated with the 'kanji conversion' button 43A. A program related to a process of confirming the kanji characters displayed as candidates to be converted into kanji characters is stored in the storage device so as to be associated with the 'confirm' button 43B. A program related to a process of deleting the last character displayed in the title input portion 41 is stored in the storage device so as to be associated with the 'one character deletion' button 43C.

The operator sequentially selects, for example, the hiragana characters or the alphabet displayed in the character display portion 42 to input a title. For example, when a title 'sekai isan' is input, the operator sequentially selects 'se', 'ka', and 'i' and pushes the 'kanji conversion' button 43A. When 'sekai' is displayed as a kanji conversion candidate, the operator pushes the 'confirm' button 43B to confirm the conversion. Then, the operator sequentially selects 'i', 'sa', and 'n'. FIGS. 15A to 15D show an example of display in which the operator selects 'sa' after 'i'.

FIG. 15B is an enlarged view schematically illustrating a portion of the screen 30. Sections are set to the characters in the character display portion 42. In the example shown in FIG. 15B, a section D10 is set to 'sa', and sections D6, D7, D11, D16, and D17 are set to 'ka', 'ki', 'si', 'ta', and 'ti' around 'sa', respectively.

When the pointer P is moved from a position in the section D16 represented by a dashed line in FIG. 15B to a position in the section D10 represented by a solid line, the pointer P passes through the boundary between the section D16 and the section D10. In this case, the comparing unit 20C calculates the distance between the coordinates indicated by the pointer and a boundary line L1 between the section D16 and the section D10. When the distance is equal to or less than a predetermined threshold value (for example, 10 pixels), the comparing unit 20C transmits the distance information to the indicated point control unit 20D.

The indicated point control unit 20D receives the information and transmits an instruction signal to the controller 180B of the input unit 1 such that force is applied to move the movable portion 11 in the direction in which the pointer P is away from the boundary line L1 (in the direction of F1 in FIG. 15D). The controller 180B receives the instruction signal, controls the current flowing through each of the coils 16A to 16D, and applies force to the movable portion 11 to move toward the operator (in the direction of F1 in FIG. 15D). However, the force is not so strong that the operator cannot operate the movable portion 11, but is enough for the operator to feel a little resistance when the pointer P passes through the boundary line L1. In this way, the operator can perceive the boundary between the sections with the sense of touch when the pointer passes through the boundary.

FIG. 15C shows the approach of the pointer P to the 'kanji conversion' button 43A. When the pointer P is moved from a position (a position outside the operation button 43A) represented by a two-dot chain line in FIG. 15C to a position (a position in the operation button 43A) represented by a solid line, the comparing unit 20C calculates the distance between the point indicated by the pointer and the outline of the operation button 43A. When the distance is equal to or less than a predetermined threshold value (for example, 20 pixels), the comparing unit 20C transmits the distance information to the indicated point control unit 20D.

The indicated point control unit 20D receives the information and transmits an instruction signal to the controller 180B of the input unit 1 such that force is applied to move the movable portion 11 in a direction (in the direction of F2 in FIG. 15D) in which the pointer P approaches the center of the operation button 43A. The controller 180B receives the instruction signal, controls the current flowing through each of the coils 16A to 16D, and applies force to the movable portion 11. The force acts to assist the operation of the operator positioning the pointer at the operation button.

Sixth Exemplary Embodiment

Figure 16A:
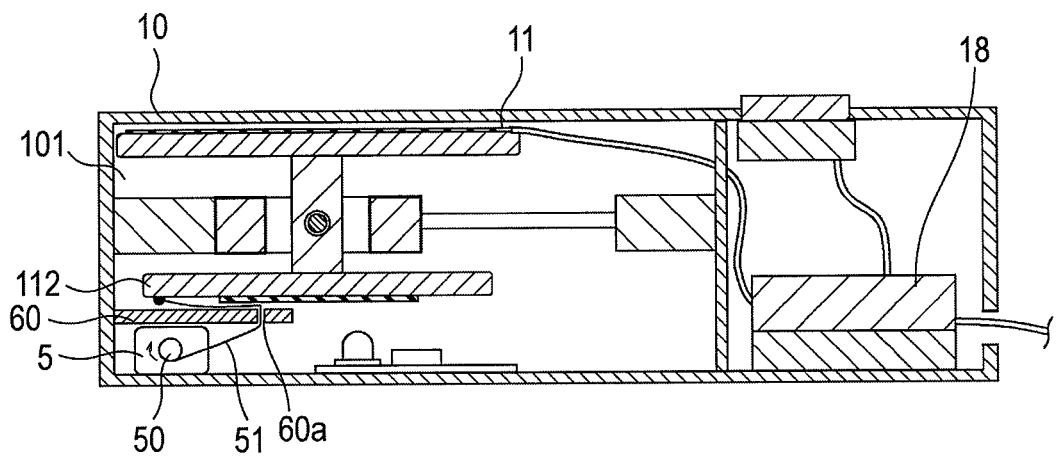
FIGS. 16A and 16B are cross-sectional views illustrating an input unit according to a sixth exemplary embodiment of the invention.
Figure 16B:
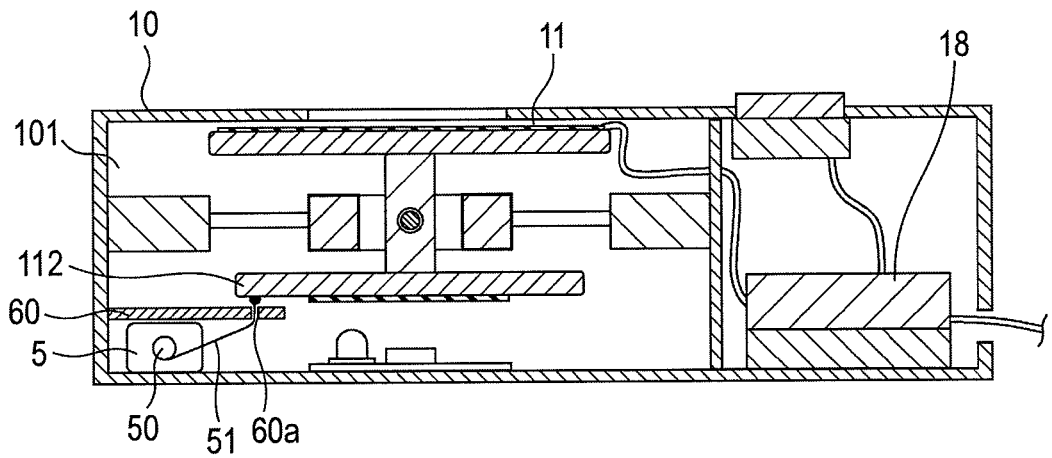

FIGS. 16A and 16B are cross-sectional views illustrating an input unit 1 according to a sixth exemplary embodiment of the invention. The input unit 1 according to this exemplary embodiment differs from the input unit 1 according to the first exemplary embodiment in the structure of the driving mechanism that applies a moving force to the movable portion 11. The other components are the same as those in the first exemplary embodiment. In FIGS. 16A and 16B, the reference numerals of the components that are not related to the driving mechanism are not shown.

An electric motor 5, which is a driving source that moves the movable portion 11, is attached to the bottom of the first accommodating portion 101 of the main body portion 10. A wire 51 is wound around a shaft 50 of the electric motor 5, and one end of the wire 51 is fixed to the end of the read plate attachment portion 112. A fixed plate 60 is fixed between the electric motor 5 and the read plate attachment portion 112, and the wire 51 passes through a hole 60a that is formed in the fixed plate 60. The control unit 18 is connected to the electric motor 5 by a wiring line (not shown), and a driving current is supplied from the control unit 18 to the electric motor 5.

As shown in FIG. 16A, when the finger of the operator is taken away from the movable portion 11 moved to the left side of FIG. 16A, the control unit 18 detects the taking-away of the finger and supplies the driving current to the electric motor 5, such that the shaft 50 is rotated in the direction of an arrow in FIG. 16A. Then, one end of the wire 51 fixed to the read plate attachment portion 112 is drawn through the hole 60a of the fixed plate 60 and the movable portion 11 is moved to the right side of FIG. 16A. FIG. 16B shows the completion of the movement of the movable portion 11. In this way, the movable portion 11 returns to the original position.

Although not shown in the drawings, even when the movable portion 11 is moved from the original position to the right side of FIG. 16A, the movable portion 11 returns to the original position by the rotation of the electric motor 5 in the same way as described above. FIGS. 16A and 16B show only one electric motor. However, actually, a set of electric motors, wires, and a fixed plate for moving the movable portion 11 in a direction orthogonal to the plane of FIG. 16 are provided.

Seventh Exemplary Embodiment

Figure 17A:
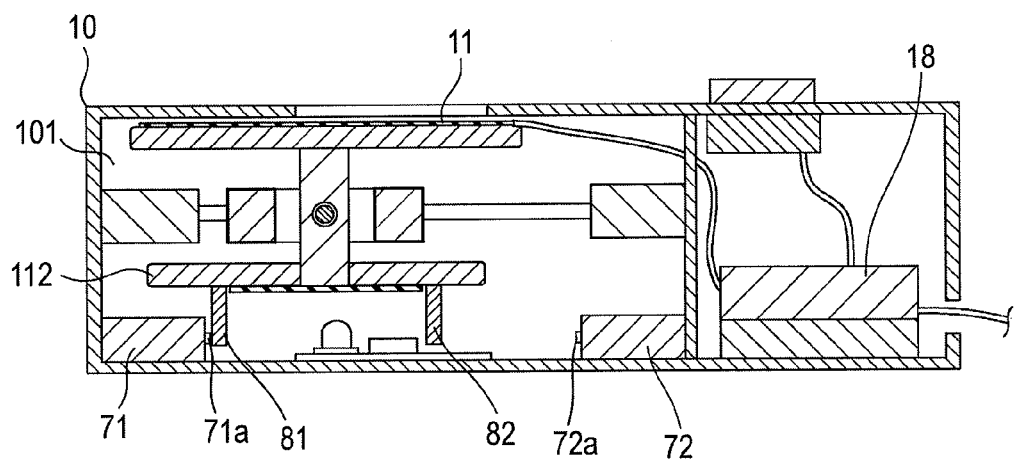
FIGS. 17A and 17B are cross-sectional views illustrating an input unit according to a seventh exemplary embodiment of the invention.
Figure 17B:
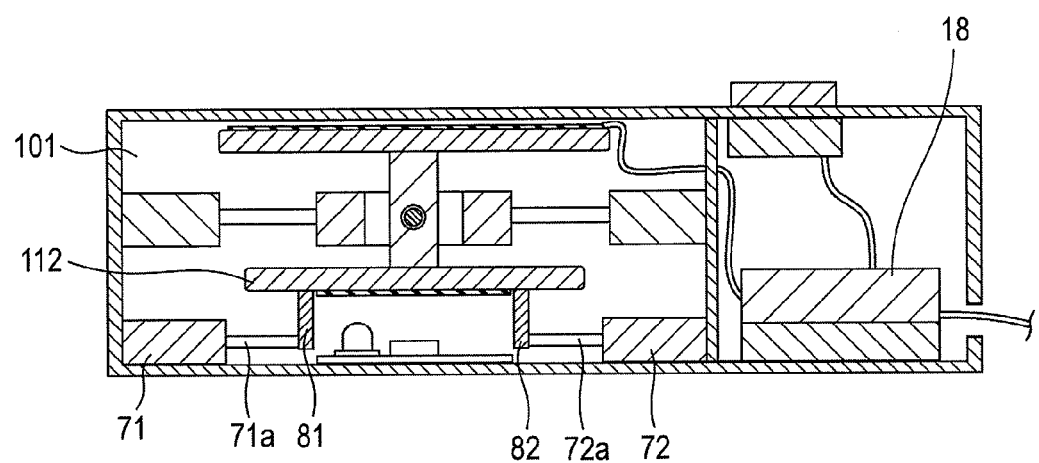

FIGS. 17A and 17B are cross-sectional views illustrating an input unit 1 according to a seventh exemplary embodiment of the invention. In this exemplary embodiment, a driving mechanism that applies a moving force to the movable portion 11 includes electromagnetic solenoids 71 and 72. The other components are the same as those in the first exemplary embodiment. In FIGS. 17A and 17B, the reference numerals of the components that are not related to the driving mechanism are not shown.

The electromagnetic solenoids 71 and 72 are attached to the bottom of the first accommodating portion 101 of the main body portion 10 so as to be opposite to each other. The electromagnetic solenoids 71 and 72 are connected to the control unit 18 by wiring lines (not shown), and shafts 71a and 72a of the electromagnetic solenoids 71 and 72 are extended or contracted by a driving current supplied from the control unit 18.

Contact plates 81 and 82 are fixed to the read plate attachment portion 112. The contact plates 81 and 82 are fixed at the positions where the leading ends of the shafts 71a and 72a come into contact with the contact plates.

As shown in FIG. 17A, when the finger of the operator is taken away from the movable portion 11 moved to the left side of FIG. 17A, the control unit 18 detects the taking-away of the finger and supplies a driving current to the electromagnetic solenoids 71 and 72, such that the shafts 71a and 72a protrude from the electromagnetic solenoids 71 and 72. Then, the leading ends of the shafts 71a and 72a come into contact with the contact plates 81 and 82 fixed to the read plate attachment portion 112 to press the contact plates 81 and 82. Then, the movable portion 11 is moved to the right side of FIG. 17A. When both sides of the read plate attachment portion 112 are pressed, the read plate attachment portion 112 does not pass the original position, and the movable portion 11 returns to the original position, as shown in FIG. 17B.

FIGS. 17A and 17B show only a pair of electromagnetic solenoids. However, actually, a pair of electromagnetic solenoids and contact plates are provided in order to move the movable portion 11 in a direction orthogonal to the plane of FIGS. 17A and 17B.

Eighth Exemplary Embodiment

Figure 18A:
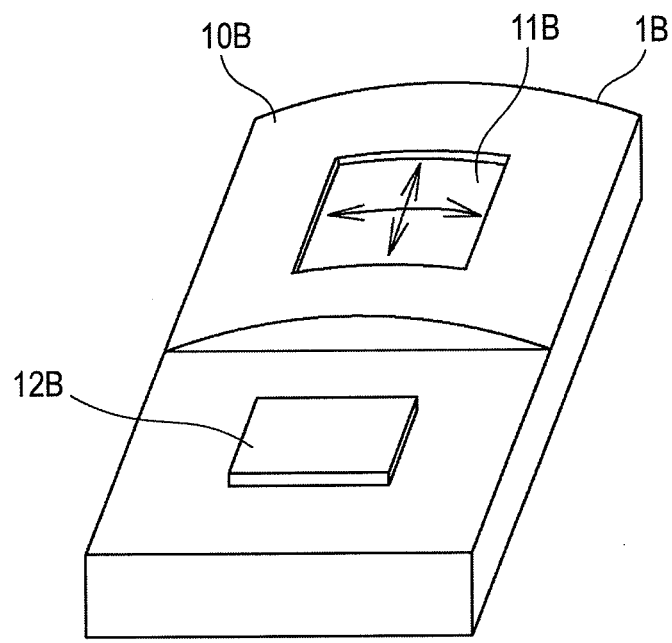
FIGS. 18A and 18B are diagrams schematically illustrating an input unit according to an eighth exemplary embodiment of the invention.
Figure 18B:
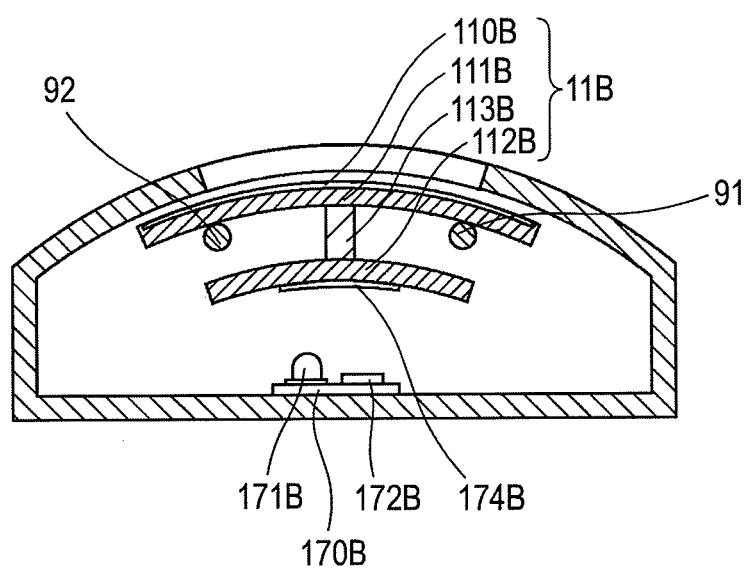

FIGS. 18A and 18B are diagrams schematically illustrating an input unit according to an eighth exemplary embodiment of the invention. This exemplary embodiment differs from the above-described exemplary embodiments in that the movable portion can be moved in a cylindrical surface shape.

FIG. 18A is a diagram illustrating the outward appearance of an input unit 1B according to the eighth exemplary embodiment of the invention. A portion of a main body portion 10B of the input unit 1B is formed on a cylindrical surface, and a portion of a movable portion 11B is exposed to the outside through an opening formed in the main body portion 10B. A switch 12B is provided in the main body portion 10B.

FIG. 18B is a cross-sectional view illustrating the input unit 1B. The movable portion 11B is formed by integrally coupling an operating portion 111B to which the contact sensor 110B is attached so as to be exposed to the outside through the opening of the main body portion 10B, a read plate attachment portion 112B to which a read plate 174B is attached, and a connecting portion 113B that connects the operating portion 111B and the read plate attachment portion 112B.

The movable portion 11B can be guided by a pair of guide members 91 and 92 fixed to the main body portion 10B to slide in the circumferential direction along the cylindrical surface of the main body portion 10B and the axial direction of the cylindrical surface of the main body portion 10B.

An LED 171B and an optical sensor 172B are mounted on a printed circuit board 170B so as to be opposite to the read plate 174B. A structure that detects the amount of movement of the movable portion 11B relative to the main body portion 10B using the read plate 174B, the LED 171B, and the optical sensor 172B and outputs the detected amount of movement and the content of a process for detecting and outputting the amount of movement are the same as those in the first exemplary embodiment and thus description thereof will be omitted. In addition, a structure for returning the movable portion 11B to the original position when the contact sensor 110B is in a non-contact state is not shown in the drawings. However, any structure according to the above-described exemplary embodiments may be used.

According to this exemplary embodiment, for example, when a cylindrical display screen using a flexible display member, such as an electronic paper, is used, it is possible to operate the pointer by moving the movable portion 11B corresponding to the shape of the display screen.

Other Exemplary Embodiments

The invention is not limited to the above-described exemplary embodiments, but various modifications and changes of the invention can be made without departing from the scope and spirit of the invention. For example, in the first exemplary embodiment, the absolute position of the movable portion 11 relative to the main body portion 10 is detected, but the invention is not limited thereto. For example, when power is supplied to the input unit 1, the movable portion 11 may be moved to the limit position of the moving range by the driving mechanism and the original position may be recognized by the relative position from that position.

In the above-described exemplary embodiments, in the non-contact state, the movable portion 11 returns to the original position, but the invention is not limited thereto. For example, when the movable portion is repeatedly operated in one direction, the movable portion 11 may be moved from the position in the non-contact state to a position that is spaced a predetermined distance from the original position. In this case, the movement distance at which the operator can operate the movable portion 11 is longer than that when the movable portion 11 returns to the original position.

In the third exemplary embodiment, force is applied to the movable portion 11 on the basis of the relationship between the content displayed on the operation screen and the display position of the pointer, but the invention is not limited thereto. Various modifications and applications can be made. For example, in the case in which it is difficult to select the operation buttons displayed on the operation screen under certain conditions, when the pointer approaches the operation button, force may be applied to the movable portion 11 in a direction in which the pointer is far away from the operation button. In this case, the operator can know that it is difficult to select the operation button. When plural operation screens are displayed and the pointer moves through the boundary between the operation screens, force may be applied to the movable portion 11 in the return direction.

The moving surface on which the movable portion can be moved relative to the main body portion is not limited to the plane or the cylindrical surface according to the above-described exemplary embodiments, but it may be a spherical surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An input device comprising:
a main body portion that has one surface;
a movable portion that has a contact surface formed in the one surface of the main body portion, is operated through the contact surface and is movable relative to the main body portion;
a supporting portion that is provided in the main body portion and movably supports the movable portion;
an applying portion that comprises a plurality of magnets and a plurality of coils and applies a force to move the movable portion;
a determining unit that comprises a contact sensor that detects a contact with the contact surface of the movable portion, the determining unit determining a state-of-contact whether the contact surface is in a contact state or in a non-contact state based on an output of the contact sensor;
a controller that controls an amount of current flowing through each coil of the applying portion and the flow direction of current to move the movable portion using a driving mechanism to a predetermined position when the state-of-contact determined by the determining unit changes from the contact state to the non-contact state; and
an output unit that detects and outputs an amount of movement of the movable portion relative to the main body portion while the state-of-contact determined by the determining unit is in contact state, and does not output the amount of movement when the controller moves the movable portion,
wherein the controller sets a magnitude of a magnetic force of each of the magnets and an amount of current flowing through each of the coils such that returning the movable portion is completed within 0.5 seconds after a finger of an operator is taken away from the contact sensor.

2. The input device according to claim 1,
wherein, when the movable portion reaches a limit position of a movable range, the output unit continuously outputs the amount of movement on a basis of the amount of movement until the movable portion reaches the limit position.

3. The input device according to claim 1, further comprising: a detector that detects a pressing of the contact surface of the movable portion and outputs information indicating the pressing of the contact surface.

4. The input device according to claim 3,
wherein the movable portion includes:
a supported portion that is supported by the supporting portion; and
a contact portion that has the contact surface formed on one surface of the contact portion and is movable relative to the supported portion in a direction vertical to the contact surface, and
the detector detects and outputs the movement of the contact portion relative to the supported portion.

5. The input device according to claim 3,
wherein the detector detects and outputs that pressure applied to the contact surface is higher than a threshold pressure.

6. An information processing apparatus comprising:
a main body portion having one surface;
a movable portion that is operated through a contact surface formed in the one surface of the main body portion and is movable relative to the main body portion;
a supporting portion that is provided in the main body portion and supports the movable portion so as to be movable along a moving surface;
an applying portion that comprises a plurality of magnets and a plurality of coils and applies a force to the movable portion along the moving surface;
a determining unit that comprises a contact sensor that detects a contact with the contact surface of the movable portion, the determining unit determining a state-of-contact whether the contact surface is in a contact state or in a non-contact state based on an output of the contact sensor;
a first controller that controls an amount of current flowing through each coil of the applying portion and the flow direction of current to move the movable portion using a drive mechanism to a position where the movable portion in contact state is located before start moving when the state-of-contact determined by the determining unit changes from the contact state to the non-contact state;

an output unit that detects and outputs an amount of movement of the movable portion relative to the main body portion while the state-of-contact determined by the determining unit is in contact state, and does not output the amount of movement when the controller moves the movable portion; and a display that displays an indicated point whose position is changed corresponding to the amount of movement of the movable portion output from the output unit, wherein the first controller sets a magnitude of a magnetic force of each of the magnets and an amount of current flowing through each of the coils such that returning the movable portion is completed within 0.5 seconds after a finger of an operator is taken away from the contact sensor.

7. The information processing apparatus according to claim 6, further comprising: a second controller that includes an operation screen to which an operation instruction is input by the indicated point and controls the applying portion on a basis of the relationship between a content in the state-of-contact determined by the determining unit displayed on the operation screen and the display position of the indicated point.

8. The information processing apparatus according to claim 7, wherein the second controller controls the applying portion such that the display position of the indicated point approaches a display region which is displayed on the operation screen of the display, the display region being stored in association with information corresponding to a process performed by an operation of selecting the display region.

9. The information processing apparatus according to claim 7, wherein the second controller controls the applying portion such that, when the indicated point approaches a boundary between sections set on the operation screen, the applying portion applies a force in a direction in which the indicated point moves away from the boundary between the sections.

10. The input device according to claim 1, further comprising a movement amount detecting unit that receives image information of the movable portion at a time interval, compares the received image information with previously received image information, and detects the amount of movement of the movable portion based on the comparison.

11. An input device comprising:

a main body portion that has a surface;

a movable portion that has a contact surface formed in the surface of the main body portion, is operated through the contact surface and is movable relative to the main body portion;

a supporting portion that is provided in the main body portion and movably supports the movable portion;

an applying portion that comprises a plurality of magnets and a plurality of coils and applies a force to move the movable portion;

a determining unit that comprises a contact sensor that detects a contact with the contact surface of the movable portion, the determining unit determining a state-of-contact whether the contact surface is in a contact state or in a non-contact state based on an output of the contact sensor;

a controller that controls an amount of current flowing through each coil of the applying portion and a flow direction of current to move the movable portion using a drive mechanism to a predetermined position when the controller determines that the movable portion is not moved by applying portion, there is no contact with the contact sensor, and the movable portion is not disposed at the predetermined position; and an output unit that detects and outputs an amount of movement of the movable portion relative to the main body portion while the state-of-contact determined by the determining unit is in the contact state, and does not output the amount of movement when the controller moves the movable portion, wherein the controller sets a magnitude of a magnetic force of each of the magnets and an amount of current flowing through each of the coils such that returning the movable portion is completed within 0.5 seconds after a finger of an operator is taken away from the contact sensor.

* * * * *